(12) United States Patent
Gharib et al.

(10) Patent No.: US 12,737,460 B2
(45) Date of Patent: Sep. 15, 2026

(54) GEOGRAPHICALLY DIVERSIFIED EMBEDDING-BASED GUIDED RESPONSE TO A SECURITY ALERT

(71) Applicant: Microsoft Technology Licensing, LLC, Redmond,, WA (US)

(72) Inventors: Amirhossein Gharib, Toronto (CA); Jovan Kalajdjieski, Vancouver (CA); Robert Lee Mccann, Snoqualmie, WA (US); Scott Alexander Freitas, Phoenix, AZ (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 134 days.

(21) Appl. No.: 18/930,985

(22) Filed: Oct. 29, 2024

(65) Prior Publication Data

US 2026/0017369 A1 Jan. 15, 2026

Related U.S. Application Data

(60) Provisional application No. 63/670,097, filed on Jul. 11, 2024.

(51) Int. Cl.
*G06F 21/00* (2013.01)
*G06F 21/55* (2013.01)

(52) U.S. Cl.
CPC ...... *G06F 21/554* (2013.01); *G06F 2221/034* (2013.01)

(58) Field of Classification Search
None
See application file for complete search history.

(56) References Cited

U.S. PATENT DOCUMENTS 11,423,146 B2 * 8/2022 Li ........................ G06F 18/2413
11,494,486 B1 * 11/2022 Kim ....................... G06N 3/045
(Continued)

FOREIGN PATENT DOCUMENTS

DE 102018202875 A1 * 8/2018 ............. G06N 20/00
WO WO-2022032285 A1 * 2/2022 ........... H04L 63/102
WO WO-2024211703 A2 * 10/2024 ........... H04L 9/3239

OTHER PUBLICATIONS

Scott Freitas, Jovan Kalajdjieski, Amir Gharib, and Robert McCann. 2025. AI-Driven Guided Response for Security Operation Centers with Microsoft Copilot for Security, ArXiv.org, Jul. 12, 2024, p. 1-10. (Year: 2024).*

(Continued)

*Primary Examiner* — Jeffery L Williams
(74) *Attorney, Agent, or Firm* — Wade IP Law PLLC

(57) ABSTRACT

Techniques are described herein that are capable of providing a geographically diversified embedding-based guided response to a security alert. A security alert regarding an identified security incident that is associated with an entity is received. Sets of designated security incidents, which are similar to the identified security incident, may be selected from sets of historical security incidents associated with respective geographical regions based on embeddings of the identified security incident and the historical security incidents in the sets. The identified security incident is classified into selected classes using first model(s) associated with the respective geographical regions. Security actions are selected from a plurality of possible security actions using second model(s) associated with the respective geographical regions. A security recommendation regarding the security alert is generated. The security recommendation includes representations of the sets of designated security incidents, the selected classes, and/or the security actions.

22 Claims, 7 Drawing Sheets

(56) References Cited

U.S. PATENT DOCUMENTS

| | | | | |
|---|---|---|---|---|
| 12,169,512 | B2 * | 12/2024 | Hamilton | G06F 16/3334 |
| 12,614,037 | B2 * | 4/2026 | De Luis Balaguer | G06F 40/30 |
| 12,615,267 | B2 * | 4/2026 | Mace | H04L 63/1416 |
| 2020/0285737 | A1 * | 9/2020 | Kraus | G06F 21/552 |
| 2022/0321581 | A1 * | 10/2022 | Sood | H04L 67/133 |
| 2022/0391198 | A1 * | 12/2022 | Decrop | H04L 51/046 |
| 2023/0275907 | A1 * | 8/2023 | Bertiger | H04L 63/1425 726/22 |
| 2023/0275908 | A1 * | 8/2023 | Mace | H04L 63/1441 726/23 |
| 2024/0305491 | A1 * | 9/2024 | Rosenoer | G06F 21/64 |
| 2024/0340301 | A1 * | 10/2024 | Thompson | H04L 63/20 |
| 2024/0394332 | A1 * | 11/2024 | Roscoe | G06F 21/552 |
| 2025/0030725 | A1 * | 1/2025 | Fellows | H04L 63/1433 |
| 2025/0112816 | A1 * | 4/2025 | Titon | H04L 41/064 |
| 2025/0155260 | A1 * | 5/2025 | Fan | G01C 21/3811 |
| 2025/0156653 | A1 * | 5/2025 | Yuan | G06F 16/3347 |
| 2025/0217634 | A1 * | 7/2025 | Bono | G06N 3/08 |
| 2025/0259075 | A1 * | 8/2025 | Crabtree | G06F 16/3344 |
| 2025/0392506 | A1 * | 12/2025 | Titon | H04L 41/064 |
| 2026/0017369 | A1 * | 1/2026 | Gharib | G06F 21/554 |

OTHER PUBLICATIONS

Co-pending U.S. Appl. No. 18/393,631 entitled "Hierarchical Representation Models,", filed on Dec. 21, 2023, 64 pages.

"Microsoft Security Copilot", Retrieved from: https://www.microsoft.com/en-in/security/business/ai-machine-learning/microsoft-security-copilot, 2024, 10 Pages.

"Triage and investigate incidents with guided responses from Microsoft Copilot in Microsoft Defender", Retrieved from: https://learn.microsoft.com/en-us/defender-xdr/security-copilot-m365d-guided-response, Nov. 19, 2024, 7 Pages.

"What is Microsoft Security Copilot?", Retrieved from: https://learn.microsoft.com/en-us/copilot/security/microsoft-security-copilot, Nov. 18, 2024, 4 Pages.

Alsubhi, et al., "Alert prioritization in intrusion detection systems", IEEE, 2008, pp. 33-40.

Alsubhi, et al., "FuzMet: a fuzzy logic based alert prioritization engine for intrusion detection systems", International Journal of Network Management, vol. 22, No. 04, Jul. 12, 2012, pp. 263-284.

Alturkistani, et al., "Optimizing cybersecurity incident response decisions using deep reinforcement learning", International Journal of Electrical and Computer Engineering (IJECE), Dec. 2022, vol. 12, No. 06, pp. 6768-6776.

Aminanto, et al., "Threat Alert Prioritization Using Isolation Forest and Stacked Auto Encoder with Day-Forward-Chaining Analysis", IEEE, vol. 08, Dec. 2, 2020, pp. 2169-3536.

Applebaum, et al., "Playbook oriented cyber response", In 2018 National Cyber Summit (NCS). IEEE, Jun. 2018, pp. 8-15.

Ban, et al., "Combat security alert fatigue with ai-assisted techniques", In Proceedings of the 14th Cyber Security Experimentation and Test Workshop, Sep. 7, 2021, pp. 9-16.

Bashendy, et al., "Intrusion response systems for cyber-physical systems: A comprehensive survey", Computers & Security, vol. 124, No. C, Jan. 2023, 102984, 9 Pages.

Duggal, et al., "HAR: Hardness Aware Reweighting for Imbalanced Datasets", IEEE International Conference on Big Data, 2021, pp. 735-745.

Duggal, et al., "REST: Robust and Efficient Neural Networks for Sleep Monitoring in the Wild", In Proceedings of The Web Conference 2020, Apr. 20, 2020, pp. 1704_1714.

Foo, et al., "ADEPTS: Adaptive Intrusion Response using Attack Graphs in an E-Commerce Environment", In 2005 International Conference on Dependable Systems and Networks (DSN'05). IEEE, Jan. 2005, pp. 508_517.

Franco, et al., "SecBot: a Business-Driven Conversational Agent for Cybersecurity Planning and Management", In 2020 16th international conference on network and service management (CNSM). IEEE, Nov. 6, 2020, 7 Pages.

Freitas, et al., "MalNet: A Large-Scale Image Database of Malicious Software", In Proceedings of the 31st ACM International Conference on Information & Knowledge Management, Oct. 17, 2022, pp. 3948-3952.

Freitas, et al., "A Large-Scale Database for Graph Representation Learning", Retrieved from: https://arxiv.org/abs/2011.07682, Nov. 7, 2021, 13 Pages.

Freitas, et al., "AI-Driven Guided Response for Security Operation Centers with Microsoft Copilot for Security", Retrieved from: https://arxiv.org/abs/2407.09017, Nov. 24, 2024, 9 Pages.

Hassan, et al., "Tactical Provenance Analysis for Endpoint Detection and Response Systems", In 2020 IEEE Symposiumon Security and Privacy, May 2020, pp. 1172-1189.

Hassan, et al., "NODOZE: Combatting Threat Alert Fatigue with Automated Provenance Triage", Network and Distributed Systems Security Symposium, Feb. 26, 2019, 15 Pages.

Huang, et al., "Cyber-physical system security for networked industrial processes", International Journal of Automation and Computing, vol. 12, Nov. 6, 2015, pp. 567-578.

Inayat, et al., "Intrusion response systems: Foundations, design, and challenges", Journal of Network and Computer Applications, vol. 62, Feb. 2016, pp. 53-74.

Jeevaprasath, "A user-centric machine learning framework for cyber security operations center", International Research Journal of Modernization in Engineering Technology and Science, vol. 06, No. 04, Apr. 2024, 6 Pages.

Jiang, et al., "Xpert: Empowering Incident Management with Query Recommendations via Large Language Models", Proceedings of the IEEE/ACM 46th International Conference on Software Engineering, No. 92, Apr. 12, 2024, 13 Pages.

Khoury, et al., "A Hybrid Game Theory and Reinforcement Learning Approach for Cyber-Physical Systems Security", In NOMS 2020-2020 IEEE/IFIP Network Operations and Management Symposium, Apr. 2020, 9 Pages.

Kraeva, et al., "Application of the Metric Learning for Security Incident Playbook Recommendation", IEEE 22nd International Conference of Young Professionals in Electron Devices and Materials (EDM), 2021, pp. 475-479.

Kremer, et al., "IC-SECURE: Intelligent System for Assisting Security Experts in Generating Playbooks for Automated Incident Response", Retrieved from: https://arxiv.org/abs/2311.03825, Nov. 7, 2023, 15 Pages.

Li, et al., "A Dynamic Decision-Making Approach for Intrusion Response in Industrial Control Systems", IEEE Transactions on Industrial Informatics, vol. 15, No. 5, Aug. 21, 2018, 11 Pages.

Lin, Tao, "A Data Triage Retrieval System for Cyber Security Operations Center", Retrieved from: https://etda.libraries.psu.edu/catalog/14787txl78, Mar. 28, 2018, 59 Pages.

Liu, et al., "RAPID: Real-Time Alert Investigation with Context-aware Prioritization for Efficient Threat Discovery", In Proceedings of the 38th Annual Computer Security Applications Conference, Dec. 5, 2022, pp. 827-840.

Mellen, et al., The Forrester Wave™, Extended Detection and Response Platforms, Q2, 2024, 12 Pages.

Nguyen, et al., "Human-in-the-Loop XAI-enabled Vulnerability Detection, Investigation, and Mitigation", In 2021 36th IEEE/ACM International Conference on Automated Software Engineering (ASE), Nov. 2021, pp. 1012-1212.

Oprea, et al., "MADE: Security Analytics for Enterprise Threat Detection", In Proceedings of the 34th Annual Computer Security Applications Conference, Dec. 3, 2018, pp. 124-136.

Perera, et al., "Intelligent soc chatbot for security operation center", In 2019 International Conference on Advancements in Computing (ICAC) IEEE, Dec. 2019, pp. 340-345.

Qin, et al., "A Risk-Based Dynamic Decision-Making Approach for Cybersecurity Protection in Industrial Control Systems", IEEE Transactions on Systems, Man, and Cybernetics, vol. 50, No. 10, Aug. 17, 2018, pp. 3863-3870.

Shameli-Sendi, et al., "Dynamic Optimal Countermeasure Selection for Intrusion Response System", IEEE Transactions on Dependable and Secure Computing, vol. 13, No. 09, Sep. 2014, 14 Pages.

(56) References Cited

OTHER PUBLICATIONS

Shameli-Sendi, et al., "Intrusion Response Systems: Survey and Taxonomy", International Journal of Computer Science and Network Security, vol. 12, No. 01, Jan. 2012, 14 Pages.
Sopan, et al., "Building a Machine Learning Model for the SOC, by the Input from the SOC, and Analyzing it for the Soc", IEEE Symposium on Visualization for Cyber Security, Oct. 2018, 8 Pages.
Stefanova, et al., "Off-Policy Q-learning Technique for Intrusion Response in Network Security", World Academy of Science, Engineering and Technology, 2018, pp. 262-268.
Toth, et al., "Evaluating the impact of automated intrusion response mechanisms", In 18th Annual Computer Security Applications Conference, IEEE, Dec. 2002, 10 Pages.
Zhong, et al., "A cyber security data triage operation retrieval system", Computers & Security, vol. 76, Jul. 2018, pp. 12-31.
Zonouz, et al., "RRE: A Game-Theoretic Intrusion Response and Recovery Engine", IEEE Transactions on Parallel and Distributed Systems, vol. 25, No. 02, Aug. 21, 2013, pp. 395-406.

* cited by examiner

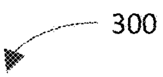

Selecting a first set of designated security incidents from a first set of historical security incidents associated with a first geographical region

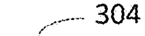

Select a first number of designated security incidents from the first set of historical security incidents to be included in the first set of designated security incidents as a result of the designated embeddings of the first number of designated security incidents and the first embedding being same and further as a result of the first number of designated security incidents corresponding to a common class of the plurality of classes

Select a second number of designated security incidents from the first set of historical security incidents to be included in the first set of designated security incidents as a result of the designated embeddings of the second number of designated security incidents and the first embedding being same and further as a result of the first number of designated security incidents corresponding to different classes of the plurality of classes

306

Select a third number of designated security incidents from the first set of historical security incidents to be included in the first set of designated security incidents as a result of the designated embeddings of the third number of designated security incidents being different from the first embedding being different

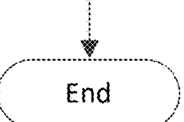

FIG. 3

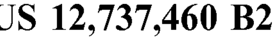

Algorithm 1: Embedding-Based Guided Response Training

Input: Alert data $\mathbf{A}$, minimum cardinality $c$, principal components $k$, max incidents sampled per IncidentHash $m$, max incidents stored per IncidentHash $s$, grid search parameters $\mathcal{G}$

Output: Incident embeddings $\mathbf{I}$ & trained models $\mathcal{M}_t$, $\mathcal{M}_s$

Feature Engineering

- $\mathbf{A} \leftarrow$ FeatureEngineering($\mathbf{A}$) ; // T1
- $\mathbf{A} \leftarrow$ FeatureSpaceCompression($\mathbf{A}, c$) ; // T2
- $\mathbf{A} \leftarrow$ OneHotEncoding($\mathbf{A}$) ; // T3
- $\mathbf{I} \leftarrow$ FormIncidents($\mathbf{A}$) ; // T4
- $\mathbf{I} \leftarrow$ SampleIncidents($\mathbf{I}, m$) ; // T5
- $\mathbf{I}, \mathbf{A} \leftarrow$ PCA($\mathbf{I}, k$), PCA($\mathbf{A}, k$) ; // T6
- StoreEmbeddings($\mathbf{I}, s$) ; // T7

Model Training

- $\mathbf{I}', \mathbf{A}' \leftarrow$ ConvertToPandas($\mathbf{I}, \mathbf{A}$) ; // T8
- $\mathcal{M}_t \leftarrow$ TrainTriageModel($\mathbf{I}', \mathcal{G}$) ; // T9
- $\mathcal{M}_r \leftarrow$ TrainRemediationModel($\mathbf{A}', \mathcal{G}$) ; // T9
- ValidateAndStoreModels($\mathcal{M}_t, \mathcal{M}_r$) ; // T10

FIG. 5

Algorithm 2: Embedding-Based Guided Response Inference

Input: Batched alert data $\mathcal{A}$, max incidents stored per IncidentHash $s$, triage and remedation models $\mathcal{M}_t$, $\mathcal{M}_r$ with confidence thresholds $c_t$, $c_r$

Output: Triage, investigation, and remediation recs

Preprocessing

```
A ← FeatureEngineering(A) ;            // T1
A ← FeatureSpaceCompression(A) ;       // T2
A ← OneHotEncoding(A) ;                // T3
I ← FormIncidents(A) ;                 // T4
I, A ← PCA(I), PCA(A) ;                // T6
StoreEmbeddings(I, s) ;                // T7
I′, A′ ← ConvertToPandas(I, A)
```

Triage Recommendations

$\mathcal{R}_{tri} \leftarrow \mathcal{M}_t(\mathbf{I})$ $\mathcal{R}_{tri} \leftarrow \text{FilterByConfidence}(\mathcal{R}_{tri}, c_t)$

Investigation Recommendations

$\mathbf{H} \leftarrow \text{RetrieveHistoricalEmbeddings}(180\ \text{days})$ $\mathcal{R}_{inv} \leftarrow \emptyset$ foreach $\mathbf{I}_{new} \in \mathbf{I}_{tri}$ do

$\mathcal{R}_{inv} \leftarrow \mathcal{R}_{inv} \cup \text{ExactHashMatch}(\mathbf{I}_{new}, \mathbf{H})$ $\mathcal{R}_{inv} \leftarrow \mathcal{R}_{inv} \cup \text{CosineSimilarityMatch}(\mathbf{I}_{new}, \mathbf{H})$ $\mathcal{R}_{inv} \leftarrow \text{SelectTopK}(\mathcal{R}_{inv}, 5)$

Remediation Recommendations

$\mathcal{R}_{rem} \leftarrow \mathcal{M}_r(\mathbf{A})$ $\mathcal{R}_{rem} \leftarrow \text{FilterByConfidence}(\mathcal{R}_{rem}, c_r)$ $\mathcal{R}_{rem} \leftarrow \text{IdentifyEntities}(\mathcal{R}_{rem})$ $\mathcal{R}_{rem} \leftarrow \text{AggregateRecommendations}(\mathcal{R}_{rem}, \mathcal{I})$

FIG. 6

GEOGRAPHICALLY DIVERSIFIED EMBEDDING-BASED GUIDED RESPONSE TO A SECURITY ALERT

CROSS-REFERENCE TO RELATED APPLICATION(S)

This application claims the benefit of U.S. Provisional Application No. 63/670,097, filed Jul. 11, 2024 and entitled "Geographically Diversified Embedding-Based Guided Response to a Security Alert," the entirety of which is incorporated herein by reference.

BACKGROUND

Cybersecurity includes measures that are taken to protect a system (e.g., a computer or a network) from cyberattacks (a.k.a. attacks, digital attacks, or malicious attacks). In the rapidly evolving cybersecurity landscape, the sharp rise in threat actors has overwhelmed many enterprise security operation centers (SOCs) with an unprecedented volume of security incidents to triage. An SOC is a system that is configured to protect a system and/or user(s) of the system from threat actors. A threat actor is an entity (e.g., a person, a group of people, or a system (e.g., an autonomous agent)) that intentionally causes (or tries to cause or is configured to cause) harm to a system and/or a user of the system. A security incident includes one or more security alerts. A security alert is an alert that indicates detection of a potential security threat with regard to a system and/or a user of the system. A potential security threat to a system and/or a user of the system is an occurrence (e.g., an action or an absence of action) that is potentially capable of causing or facilitating harm to the system and/or the user of the system. Techniques that partially or fully automate remediation of security incidents have been proposed. However, each such technique has its limitations. For instance, fully automated systems typically demand a substantially high confidence threshold to ensure appropriate actions are taken 99% of the time, for example, to avoid inadvertently disabling critical enterprise assets. Consequently, attaining such a high level of confidence often renders full automation impractical. Guided response (GR) systems have been developed in an effort to address the shortcomings of fully automated systems. However, GR systems also have their limitations, especially with regard to scalability and accuracy.

SUMMARY

It may be desirable to use a geographically diversified embedding-based technique to provide guided response to a security alert that is associated with (e.g., included in) an identified security incident. In context of cybersecurity, a guided response is a step-by-step recommendation of steps to be performed to address (e.g., investigate, triage, mitigate, contain, and/or remediate) security alert(s) (e.g., an identified security incident that includes the security alert(s)). A guided response system is a system that is configured to generate a guided response. The identified security incident may be a misconfiguration of a security setting or a permission, a data breach, an insider threat, a system failure (e.g., hardware failure, software glitch, or power outage), a policy violation, or a cyberattack (a.k.a. attack, cybersecurity attack, digital attack, or malicious attack). An insider threat is a security threat caused by a person associated with (e.g., within) an organization that is affected by the security threat. For instance, an employee, contractor, or partner of the organization may intentionally or unintentionally compromise security of the organization (e.g., by sharing credentials, mishandling data, or installing unauthorized software). A cyberattack is an attempt to cause harm to a system and/or a user of the system. For instance, the system may be a computing system (e.g., a personal computer, a server, or an Internet of things (IoT) device), a network, a router, a switch, or a firewall. In an example, the harm may be an unauthorized or illegal access to the system.

Examples of a cyberattack include but are not limited to a denial of service (DOS) attack, a distributed DoS (DDOS) attack, a man-in-the-middle (MI™) attack, a malware attack, a phishing attack, a ransomware attack, and a cross-site scripting (XSS) attack. A DOS attack is an attack that renders a system unable to respond to a legitimate service request by overwhelming resource(s) of the system. A DDOS attack is similar to a DOS attack but involves multiple (e.g., a vast array) malware-infected hosts that are controlled by the threat actor to cause resource exhaustion. An MI™ attack is an attack that enables the threat actor to eavesdrop on data exchanged between multiple entities (e.g., people, networks, or computers). A malware attack is an attack in which malicious software is introduced (e.g., injected) to a system to damage the system and/or to steal information from the system. A phishing attack is an attack in which a deceptive communication (e.g., an electronic mail (a.k.a. email) message) is provided to an entity to trick the entity into revealing sensitive information or into downloading malware. A ransomware attack is an attack that encrypts file(s) and/or system(s) and demands payment (a.k.a. a ransom) for decryption. An XSS attack exploits a vulnerability of a web application to introduce a malicious script into a web page that is viewed by other users.

The extensive variety of security products, each with thousands of custom and built-in detection rules, may create a complex incident landscape that is compounded by a scarcity of labeled data. The geographically diversified embedding-based technique may be capable of providing guided response in such a complex incident landscape more accurately, precisely, and/or reliably than conventional guided response techniques. The geographically diversified embedding-based technique may be capable of a higher recall across investigation, triaging, and remediation tasks than the conventional guided response techniques. The geographically diversified embedding-based technique may be capable of utilizing a robust and scalable machine learning (ML) architecture to generate recommendations at a relatively high scale (e.g., a million-scale) across terabytes of data. The geographically diversified embedding-based technique may be capable of adapting to specific operational workflows, product configurations, and detection logic of individual SOCs. The geographically diversified embedding-based technique may be capable of continuously learning and improving autonomously to remain effective against evolving cyberthreats and changes in the security product landscape.

Various approaches are described herein for, among other things, providing a geographically diversified embedding-based guided response to a security alert. In an example approach, a security alert is received. The security alert pertains to an identified security incident that is associated with an entity. Sets of designated security incidents (e.g., similar security incidents) may be selected from sets of historical security incidents associated with respective geographical regions as a result of distances between a first embedding and sets of designated embeddings being less than or equal to distances between the first embedding and sets of other embeddings. The first embedding represents the identified security incident. The sets of designated embeddings represent the sets of designated security incidents. The sets of other embeddings represent sets of other security incidents in the sets of historical security incidents. The identified security incident is classified into selected classes. The selected classes are determined from a plurality of classes by applying the first embedding to first models. The first models are trained to map sets of second embeddings to corresponding sets of classes of the plurality of classes. The sets of second embeddings represent the sets of historical security incidents associated with the respective geographical regions. The plurality of classes correspond to validity of security concerns and/or maliciousness of actions that result in the security concerns. Security actions are selected from a plurality of possible security actions to be performed with regard to the entity in the respective geographical regions by applying a third embedding to second models that are trained to map sets of fourth embeddings to corresponding sets of security actions. The third embedding represents the security alert. The sets of fourth embeddings represent sets of historical security alerts associated with the respective geographical regions. A security action is an action that is configured to increase security of an entity (e.g., a system and/or a user of the system). A security recommendation regarding the security alert is generated. A security recommendation is a recommendation of action(s) to be performed to address (e.g., investigate, triage, mitigate, contain, and/or remediate) a security alert. The security recommendation includes a representation of the sets of designated security incidents, a representation of the selected classes into which the identified security incident is classified, and/or a representation of the security actions to be performed with regard to the entity in the respective geographical regions.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

FIG. 3 depicts a flowchart of an example method for selecting a set of designated security incidents from a set of historical security incidents associated with a geographical region in accordance with an embodiment.

FIG. 5 depicts an example guided response training algorithm in accordance with an embodiment.

FIG. 6 depicts an example guided response inference algorithm in accordance with an embodiment.

Figure 1:
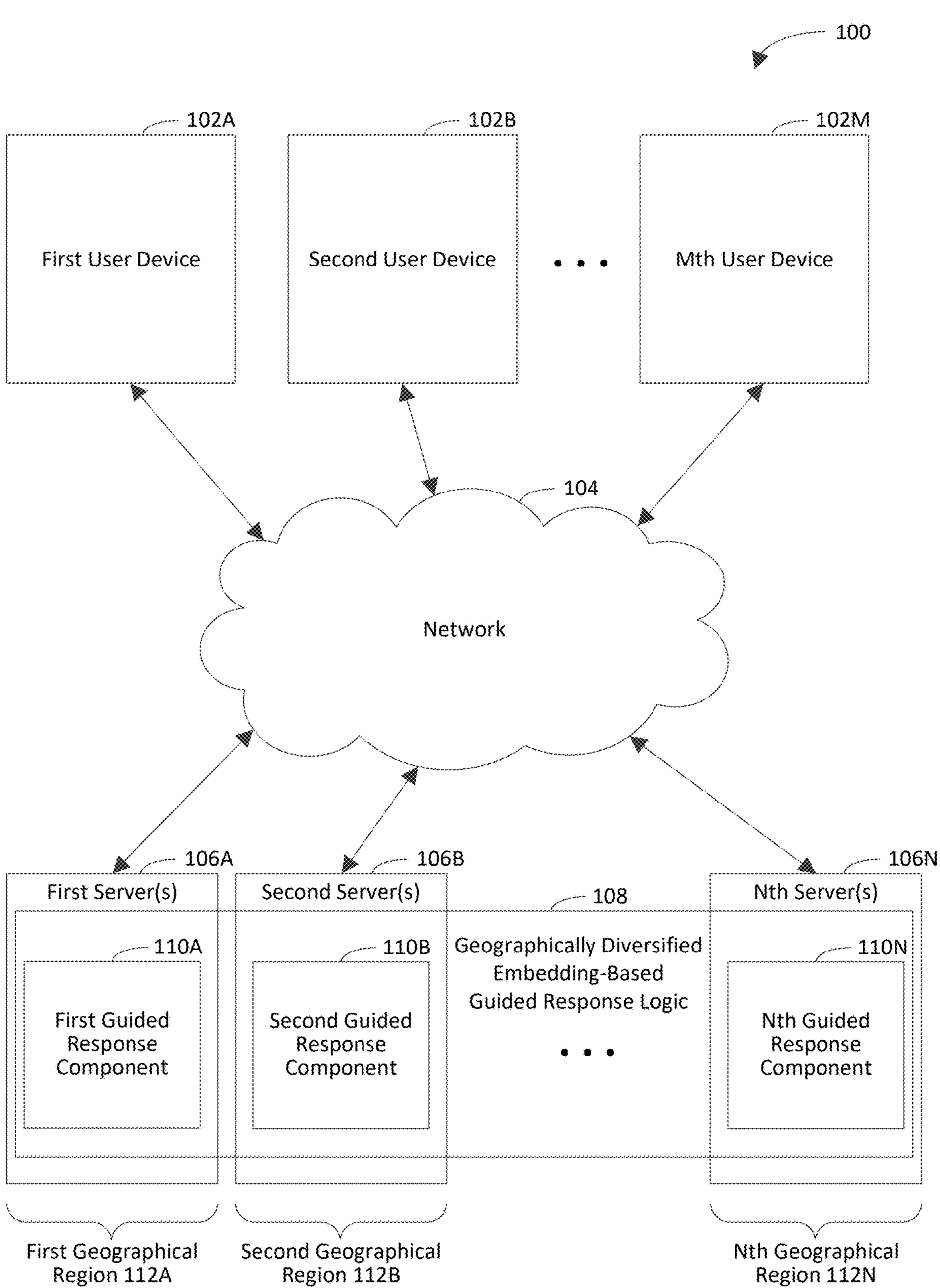
FIG. 1 is a block diagram of an example geographically diversified embedding-based guided response system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Example Embodiments

It may be desirable to use a geographically diversified embedding-based technique to provide guided response to a security alert that is associated with (e.g., included in) an identified security incident. In context of cybersecurity, a guided response is a step-by-step recommendation of steps to be performed to address (e.g., investigate, triage, mitigate, contain, and/or remediate) security alert(s) (e.g., an identified security incident that includes the security alert(s)). A guided response system is a system that is configured to generate a guided response. The identified security incident may be a misconfiguration of a security setting or a permission, a data breach, an insider threat, a system failure (e.g., hardware failure, software glitch, or power outage), a policy violation, or a cyberattack (a.k.a. attack, cybersecurity attack, digital attack, or malicious attack). An insider threat is a security threat caused by a person associated with (e.g., within) an organization that is affected by the security threat. For instance, an employee, contractor, or partner of the organization may intentionally or unintentionally compromise security of the organization (e.g., by sharing credentials, mishandling data, or installing unauthorized software). A cyberattack is an attempt to cause harm to a system and/or a user of the system. For instance, the system may be a computing system (e.g., a personal computer, a server, or an Internet of things (IoT) device), a network, a router, a switch, or a firewall. In an example, the harm may be an unauthorized or illegal access to the system.

Examples of a cyberattack include but are not limited to a denial of service (DOS) attack, a distributed DoS (DDOS) attack, a man-in-the-middle (MI™) attack, a malware attack, a phishing attack, a ransomware attack, and a cross-site scripting (XSS) attack. A DOS attack is an attack that renders a system unable to respond to a legitimate service request by overwhelming resource(s) of the system. A DDOS attack is similar to a DOS attack but involves multiple (e.g., a vast array) malware-infected hosts that are controlled by the threat actor to cause resource exhaustion. An MI™ attack is an attack that enables the threat actor to eavesdrop on data exchanged between multiple entities (e.g., people, networks, or computers). A malware attack is an attack in which malicious software is introduced (e.g., injected) to a system to damage the system and/or to steal information from the system. A phishing attack is an attack in which a deceptive communication (e.g., an electronic mail (a.k.a. email) message) is provided to an entity to trick the entity into revealing sensitive information or into downloading malware. A ransomware attack is an attack that encrypts file(s) and/or system(s) and demands payment (a.k.a. a ransom) for decryption. An XSS attack exploits a vulnerability of a web application to introduce a malicious script into a web page that is viewed by other users.

The extensive variety of security products, each with thousands of custom and built-in detection rules, may create a complex incident landscape that is compounded by a scarcity of labeled data. The geographically diversified embedding-based technique may be capable of providing guided response in such a complex incident landscape more accurately, precisely, and/or reliably than conventional guided response techniques. The geographically diversified embedding-based technique may be capable of a higher recall across investigation, triaging, and remediation tasks than the conventional guided response techniques. The geographically diversified embedding-based technique may be capable of utilizing a robust and scalable machine learning (ML) architecture to generate recommendations at a relatively high scale (e.g., a million-scale) across terabytes of data. The geographically diversified embedding-based technique may be capable of adapting to specific operational workflows, product configurations, and detection logic of individual SOCs. The geographically diversified embedding-based technique may be capable of continuously learning and improving autonomously to remain effective against evolving cyberthreats and changes in the security product landscape.

Example embodiments described herein are capable of providing a geographically diversified embedding-based guided response to a security alert. In an example approach, a security alert is received. The security alert pertains to an identified security incident that is associated with an entity. Sets of designated security incidents (e.g., similar security incidents) may be selected from sets of historical security incidents associated with respective geographical regions as a result of distances between a first embedding and sets of designated embeddings being less than or equal to distances between the first embedding and sets of other embeddings. The first embedding represents the identified security incident. The sets of designated embeddings represent the sets of designated security incidents. The sets of other embeddings represent sets of other security incidents in the sets of historical security incidents. The identified security incident is classified into selected classes. The selected classes are determined from a plurality of classes by applying the first embedding to first models. The first models are trained to map sets of second embeddings to corresponding sets of classes of the plurality of classes. The sets of second embeddings represent the sets of historical security incidents associated with the respective geographical regions. The plurality of classes correspond to validity of security concerns and/or maliciousness of actions that result in the security concerns. Security actions are selected from a plurality of possible security actions to be performed with regard to the entity in the respective geographical regions by applying a third embedding to second models that are trained to map sets of fourth embeddings to corresponding sets of security actions. The third embedding represents the security alert. The sets of fourth embeddings represent sets of historical security alerts associated with the respective geographical regions. A security action is an action that is configured to increase security of an entity (e.g., a system and/or a user of the system). A security recommendation regarding the security alert is generated. A security recommendation is a recommendation of action(s) to be performed to address (e.g., investigate, triage, mitigate, contain, and/or remediate) a security alert. The security recommendation includes a representation of the sets of designated security incidents, a representation of the selected classes into which the identified security incident is classified, and/or a representation of the security actions to be performed with regard to the entity in the respective geographical regions.

Example techniques described herein have a variety of benefits as compared to conventional techniques for providing a guided response to a security alert. For instance, the example techniques are capable of increasing security of an entity that encounters the security alert more accurately, precisely, and/or reliably than the conventional techniques. The example techniques are capable of selecting security actions to be performed with regard to the entity in respective geographical regions and/or generating a security recommendation regarding the security alert more accurately, precisely, and/or reliably than the conventional techniques.

The example techniques are capable of reducing an amount of knowledge required by a security analyst to effectively address the security alert. The example techniques are capable of reducing a number of repetitive investigations regarding security alerts and/or a likelihood of performing such repetitive investigations. The example techniques are capable of addressing (e.g., containing) a security threat more quickly than the conventional techniques. For instance, the example techniques may be capable of addressing the security threat within two or three minutes. The example techniques are capable of processing more security incidents per unit of time than the conventional techniques. For instance, the example techniques may be capable of processing millions of security incidents per day.

The example techniques are capable of enhancing the operational capabilities of SOCs by streamlining the decision-making process and providing actionable insights across a variety of tasks, such as investigation, triaging, and remediation. As a result, end users may benefit from a more resilient security posture that is fortified by adaptive AI-driven (e.g., ML-driven) guided responses tailored to the attributes of their specific security environments. The number of security incidents encountered by a system may vary substantially across geographical regions. For instance, tens of thousands of security incidents may be processed daily in some regions, and millions of security incidents may be processed daily in other regions. The example techniques are capable of adapting to the attributes of the geographical regions (e.g., the number of security incidents encountered in each geographical region). The example techniques may enhance operational efficiency of a security analyst while reducing a cognitive load that is experienced by the security analyst. By streamlining aspects of the decision-making process, the example techniques enable a security analyst to focus on strategic issues, which empowers the security analyst to triage security incidents more effectively than the conventional techniques, regardless whether the security analyst is a novice or has substantial experience.

The example techniques may reduce an amount of time and/or resources (e.g., processor cycles, memory, network bandwidth) that is consumed to determine security actions that are to be performed with regard to an entity that encounters a security alert and/or to generate a security recommendation regarding the security alert. For example, by selecting sets of designated security incidents from sets of historical security incidents associated with respective geographical regions using distances between an embedding of an identified security incident that includes the security alert and sets of embeddings of the sets of designated security incidents, the example techniques may reduce the amount of time and/or resources that otherwise would have been consumed to identify historical security incidents that share attribute(s) with the identified security incident, thereby reducing the amount of time and/or resources that is consumed to determine the security actions and/or to generate the security recommendation. In another example, by classifying the identified security incident into selected classes, which includes applying the embedding of the identified security incident to models that are trained to map sets of embeddings of the sets of historical security incidents to corresponding sets of classes that correspond to validity of security concerns and/or maliciousness of actions that result in the security concerns, the example techniques may reduce the amount of time and/or resources that otherwise would have been consumed to determine validity and/or maliciousness of action(s) associated with the identified security incident, thereby reducing the amount of time and/or resources that is consumed to determine the security actions and/or to generate the security recommendation. In yet another example, by applying an embedding of the security alert to models that are trained to map sets of embeddings of sets of historical security alerts associated with the respective geographical regions to corresponding sets of security actions, the example techniques may reduce the amount of time and/or resources that is consumed to determine the security actions, thereby reducing the amount of time and/or resources that is consumed to generate the security recommendation.

The example techniques may automate identifying historical security incidents that share attribute(s) with the identified security incident, determining validity and/or maliciousness of action(s) associated with the identified security incident, and/or determining the security actions to be performed with regard to the entity in the respective geographical regions.

By reducing the amount of time and/or resources that is consumed by a computing system to determine security actions that are to be performed with regard to an entity that encounters a security alert and/or to generate a security recommendation regarding the security alert, the efficiency of the computing system may be increased.

By reducing the amount of time that is consumed to determine security actions that are to be performed with regard to an entity that encounters a security alert and/or to generate a security recommendation regarding the security alert, the example techniques may increase a user experience and/or efficiency of a security professional who manages security of a system associated with the security alert (e.g., the identified security incident that includes the security alert) and/or an end user who uses the system. The example techniques may reduce a number of tasks that are manually performed by the security professional and/or the end user by automating identification of historical security incidents that share attribute(s) with the identified security incident, determination of validity and/or maliciousness of action(s) associated with the identified security incident, and/or determination of the security actions to be performed with regard to the entity in the respective geographical regions.

Reducing the number of tasks that are manually performed by the security professional may enable the security professional to focus on other tasks, which may increase the security of the AI model. The user experience and/or efficiency of the security professional and/or the end user may be increased in other ways, as well. For example, the user experience and/or the efficiency may be increased by increasing the security of the AI model. In another example, the user experience and/or the efficiency may be increased by selecting the security actions to be performed with regard to the entity in the respective geographical regions and/or generating the security recommendation regarding the security alert more accurately, precisely, and/or reliably.

FIG. 1 is a block diagram of an example geographically diversified embedding-based guided response system 100 in accordance with an embodiment. Generally speaking, the geographically diversified embedding-based guided response system 100 operates to provide information to users in response to requests (e.g., hypertext transfer protocol (HTTP) requests) that are received from the users. The information may include documents (Web pages, images, audio files, video files, etc.), output of executables, and/or any other suitable type of information. In accordance with example embodiments described herein, the geographically diversified embedding-based guided response system 100 provides a geographically diversified embedding-based guided response to a security alert. Detail regarding techniques for providing a geographically diversified embedding-based guided response to a security alert is provided in the following discussion.

As shown in FIG. 1, the geographically diversified embedding-based guided response system 100 includes a plurality of user devices 102A-102M, a network 104, and a plurality of servers 106A-106N. Communication among the user devices 102A-102M and the servers 106A-106N is carried out over the network 104 using well-known network communication protocols. The network 104 may be a wide-area network (e.g., the Internet), a local area network (LAN), another type of network, or a combination thereof.

The user devices 102A-102M are computing systems that are capable of communicating with servers 106A-106N. A computing system is a system that includes at least a portion of a processor system such that the portion of the processor system includes at least one processor that is capable of manipulating data in accordance with a set of instructions. A processor system includes one or more processors, which may be on a same (e.g., single) device or distributed among multiple (e.g., separate) devices. For instance, a computing system may be a computer, a personal digital assistant, etc. The user devices 102A-102M are configured to provide requests to the servers 106A-106N for requesting information stored on (or otherwise accessible via) the servers 106A-106N. For instance, a user may initiate a request for executing a computer program (e.g., an application) using a client (e.g., a Web browser, Web crawler, or other type of client) deployed on a user device 102 that is owned by or otherwise accessible to the user. In accordance with some example embodiments, the user devices 102A-102M are capable of accessing domains (e.g., Web sites) hosted by the servers 104A-104N, so that the user devices 102A-102M may access information that is available via the domains. Such domain may include Web pages, which may be provided as hypertext markup language (HTML) documents and objects (e.g., files) that are linked therein, for example.

Each of the user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more of the user devices 102A-102M may communicate with any one or more of the servers 106A-106N.

The servers 106A-106N are computing systems that are capable of communicating with the user devices 102A-

102M. The servers 106A-106N are configured to execute computer programs that provide information to users in response to receiving requests from the users. For example, the information may include documents (Web pages, images, audio files, video files, etc.), output of executables, or any other suitable type of information. In accordance with some example embodiments, the servers 106A-106N are configured to host respective Web sites, so that the Web sites are accessible to users of the geographically diversified embedding-based guided response system 100.

One example type of computer program that may be executed by one or more of the servers 106A-106N is a computer security program. A computer security program is a computer program that provides security with regard to information and/or communications associated with a computing system. For instance, the information associated with the computing system may include information stored on the computing system and/or information accessed (e.g., read) by the computing system. The communications associated with the computing system may include communications received by the computing system and/or communications provided (e.g., transmitted) by the computing system. An example of a communication is an electronic message. Examples of a computer security program include Bitdefender® security program, developed and distributed by Bitdefender IPR Management Ltd.; Norton® security program, developed and distributed by Gen Digital Inc.; Avast® security program, developed and distributed by Avast Software S.R.O.; McAfee® security program, developed and distributed by McAfee, LLC; and Microsoft Defender® security program, developed and distributed by Microsoft Corporation. It will be recognized that the example techniques described herein may be implemented using a computer security program. For instance, a software product (e.g., a subscription service, a non-subscription service, or a combination thereof) may include the computer security program, and the software product may be configured to perform the example techniques, though the scope of the example embodiments is not limited in this respect.

The computer security program may be a cloud native application protection platform (CNAPP). A CNAPP is an all-in-one platform that unifies security and compliance capabilities to prevent, detect, and respond to cloud security threats. A CNAPP integrates multiple cloud security solutions, which traditionally have been siloed, into a common (e.g., single) user interface. The cloud security solutions may include cloud security posture management (CSPM), multipipeline development and operations (DevOps) security, a cloud workload protection platform (CWPP), cloud infrastructure entitlement management (CIEM), and cloud service network security (CSNS). CSPM provides a connected, prioritized view of potential vulnerabilities and misconfigurations across multi-cloud and hybrid environments. The CSPM continuously assesses overall security posture of a system and provides automated alerts and recommendations about critical issues that could expose the system to data breaches. The CSPM may include automated compliance management and remediation tools to identify and remedy compliance deficiencies. Multipipeline DevOps security provides a central console that enables management of DevOps security across multiple (e.g., all) pipelines. For instance, the multipipeline DevOps security may be used to reduce cloud misconfigurations and to scan new code to keep vulnerabilities therein from reaching a production environment. The multipipeline DevOps security may include infrastructure-as-code scanning tools that analyze configuration files from the earliest stages of development to confirm that new configuration files are compliant with security policies. A CWPP provides real-time detection and response to threats based on up-to-date information regarding multi-cloud workloads (e.g., virtual machines, containers, Kubernetes, databases, storage accounts, network layers, and app services). The CWPP may enable a quick investigation into threats and reduce the attack surface of a system. CIEM centralizes permissions management across a cloud and hybrid footprint, which inhibits (e.g., prevents) accidental or malicious misuse of permissions. CSNS complements the CWPP by protecting cloud infrastructure in real time. The CSNS may include any of a variety of security tools, including but not limited to distributed denial-of-service protection, web application firewalls, transport layer security examination, and load balancing.

A computer security program may be incorporated into a cloud computing program (a.k.a. a cloud service). A cloud computing program is a computer program that provides hosted service(s) via a network (e.g., network 104). For instance, the hosted service(s) may be hosted by any one or more of the servers 106A-106N. The cloud computing program may enable users (e.g., at any of the user systems 102A-102M) to access shared resources that are stored on or are otherwise accessible to the server(s) via the network.

The cloud computing program may provide hosted service(s) according to any of a variety of service models, including but not limited to Backend as a Service (BaaS), Software as a Service (SaaS), Platform as a Service (PaaS), and Infrastructure as a Service (IaaS). BaaS enables applications (e.g., software programs) to use a BaaS provider's backend services (e.g., push notifications, integration with social networks, and cloud storage) running on a cloud infrastructure. SaaS enables a user to use a SaaS provider's applications running on a cloud infrastructure. PaaS enables a user to develop and run applications using a PaaS provider's application development environment (e.g., operating system, programming-language execution environment, database) on a cloud infrastructure. IaaS enables a user to use an IaaS provider's computer infrastructure (e.g., to support an enterprise). For example, IaaS may provide to the user virtualized computing resources that utilize the IaaS provider's physical computer resources.

Examples of a cloud computing program include but are not limited to a Google Cloud® program developed and distributed by Google Inc.; an Oracle Cloud® program developed and distributed by Oracle Corporation; an Amazon Web Services® program developed and distributed by Amazon.com, Inc.; a Salesforce® program developed and distributed by Salesforce.com, Inc.; an AppSource® program developed and distributed by Microsoft Corporation; an Azure® program developed and distributed by Microsoft Corporation; a GoDaddy® program developed and distributed by GoDaddy.com LLC; and a Rackspace® program developed and distributed by Rackspace US, Inc. It will be recognized that the example techniques described herein may be implemented using a cloud computing program. For instance, a software product (e.g., a subscription service, a non-subscription service, or a combination thereof) may include the cloud computing program, and the software product may be configured to perform the example techniques, though the scope of the example embodiments is not limited in this respect.

The servers 106A-106N are located in respective geographical regions 112A-112N. For instance, the first server (s) are located in a first geographical region 112A. The second server(s) are located in a second geographical region 112B that is different from the first geographical region 112A, and so on. The geographical regions 112A-112N are diversified, meaning that each of the geographical regions 112A-112N is different from the other geographical regions. In an aspect, the geographical regions 112A-112N are mutually exclusive.

The first server(s) 106A are shown to include geographically diversified embedding-based guided response logic 108 for illustrative purposes. The geographically diversified embedding-based guided response logic 108 is configured to provide a geographically diversified embedding-based guided response to a security alert. In an example implementation, the geographically diversified embedding-based guided response logic 108 receives a security alert. The security alert pertains to an identified security incident that is associated with an entity. The geographically diversified embedding-based guided response logic 108 may select sets of designated security incidents from sets of historical security incidents associated with respective geographical regions as a result of distances between a first embedding and sets of designated embeddings being less than or equal to distances between the first embedding and sets of other embeddings. The first embedding represents the identified security incident. The sets of designated embeddings represent the sets of designated security incidents. A designated security incident is a security incident that is deemed to be similar to the identified security incident as a result of the designated security incident being represented by a designated embedding. A designated embedding is an embedding that satisfies a similarity criterion with regard to a first embedding, which represents the identified security incident. In an aspect, the similarity criterion requires a distance between the first embedding and the designated embedding to be less than or equal to one or more distances between the first embedding and one or more other embeddings, respectively. For instance, the similarity criterion may require that the designated embedding be one of N embeddings that are closest to the first embedding, where N is a positive integer (e.g., a positive integer that is greater than one). In another aspect, the similarity criterion requires a distance between the first embedding and the designated embedding to be less than or equal to a distance threshold (e.g., a predefined distance threshold). For instance, the distance threshold may be a fixed distance threshold. The sets of other embeddings represent sets of other security incidents in the sets of historical security incidents. The geographically diversified embedding-based guided response logic 108 classifies the identified security incident into selected classes. The selected classes are determined from a plurality of classes by applying the first embedding to first models. The first models are trained to map sets of second embeddings to corresponding sets of classes of the plurality of classes. The sets of second embeddings represent the sets of historical security incidents associated with the respective geographical regions. The plurality of classes correspond to validity of security concerns and/or maliciousness of actions that result in the security concerns. The geographically diversified embedding-based guided response logic 108 selects security actions from a plurality of possible security actions to be performed with regard to the entity in the respective geographical regions by applying a third embedding to second models that are trained to map sets of fourth embeddings to corresponding sets of security actions. The third embedding represents the security alert. The sets of fourth embeddings represent sets of historical security alerts associated with the respective geographical regions. The geographically diversified embedding-based guided response logic 108 generates a security recommendation regarding the security alert. The security recommendation includes a representation of the sets of designated security incidents, a representation of the selected classes into which the identified security incident is classified, and/or a representation of the security actions to be performed with regard to the entity in the respective geographical regions.

The geographically diversified embedding-based guided response logic 108 may be implemented in various ways to provide a geographically diversified embedding-based guided response to a security alert, including being implemented in hardware, software, firmware, or any combination thereof. For example, the geographically diversified embedding-based guided response logic 108 may be implemented as computer program code configured to be executed in one or more processors. In another example, at least a portion of the geographically diversified embedding-based guided response logic 108 may be implemented as hardware logic/electrical circuitry. For instance, at least a portion of the geographically diversified embedding-based guided response logic 108 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (a microcontroller, microprocessor, digital signal processor (DSP), etc.), memory, one or more communication interfaces, and/or further circuits and/or embedded firmware to perform its functions.

It will be recognized that the geographically diversified embedding-based guided response logic 108 may be (or may be included in) a computer security program and/or a cloud computing program, though the scope of the example embodiments is not limited in this respect.

The geographically diversified embedding-based guided response logic 108 is shown to be distributed across the servers 106A-106N. The geographically diversified embedding-based guided response logic 108 includes a plurality of guided response components 110A-110N. The guided response components 110A-110N are incorporated into the respective servers 106A-106N. In an aspect, the servers 106A-106N host the guided response components 110A-110N. The first guided response component 110A performs the techniques described herein with regard to historical security incidents and historical security alerts associated with the first geographical region 112A. The second guided response component 110B performs the techniques described herein with regard to historical security incidents and historical security alerts associated with the second geographical region 112B, and so on. The techniques described herein may be tenant-specific, meaning that the technique is performed with regard to historical security incidents and historical security alerts associated with a particular tenant (e.g., customer or organization).

It will be recognized that at least a portion of the geographically diversified embedding-based guided response logic 108 may be incorporated in any one or more of the user devices 102A-102M. For example, client-side aspects of the geographically diversified embedding-based guided response logic 108 may be incorporated in one or more of the user devices 102A-102M, and server-side aspects of the geographically diversified embedding-based guided response logic 108 may be incorporated in the servers 106A-106N.

Figure 2:
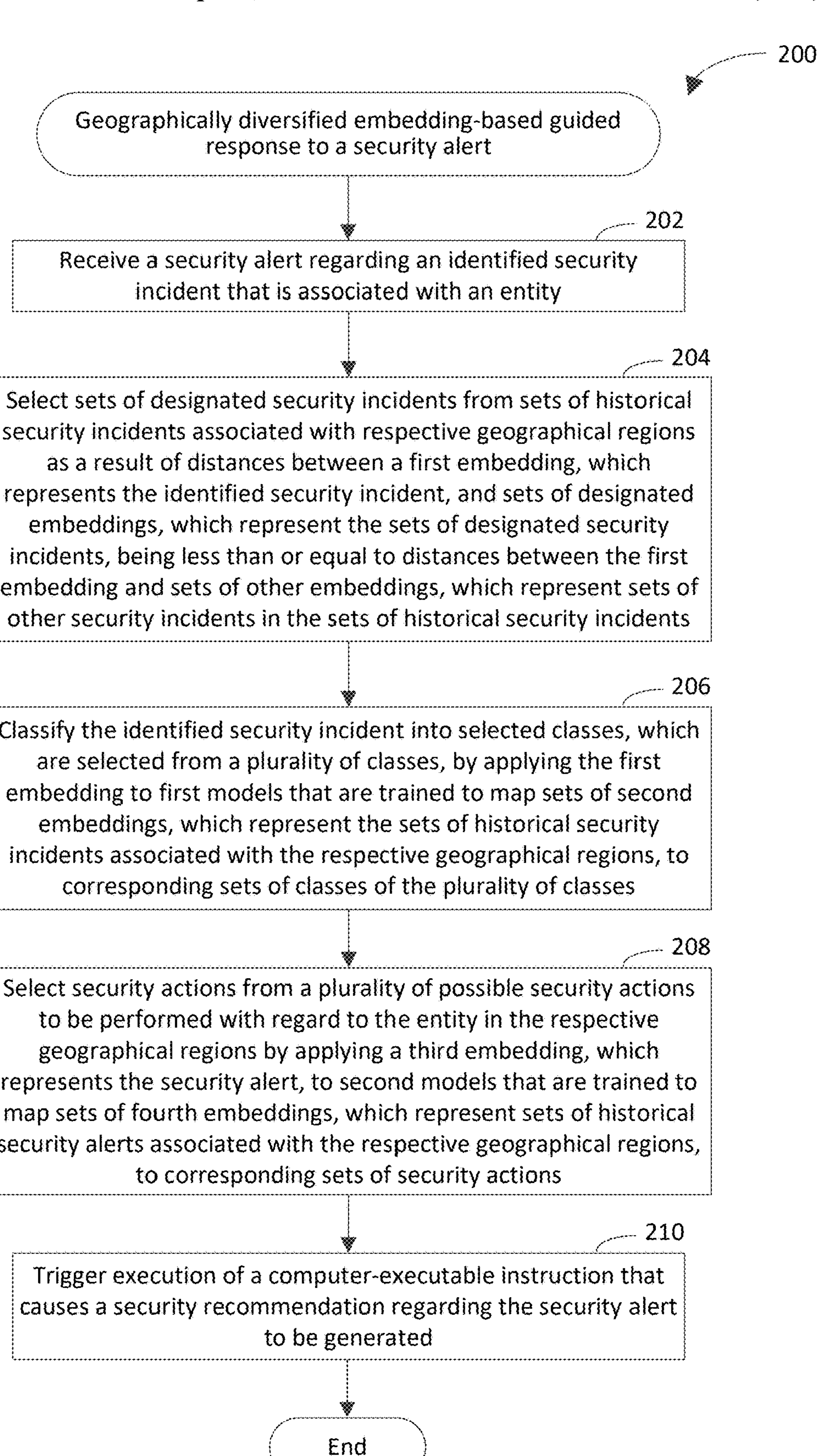
FIG. 2 depicts a flowchart of an example method for providing a geographically diversified embedding-based guided response to a security alert in accordance with an embodiment.
Figure 4:
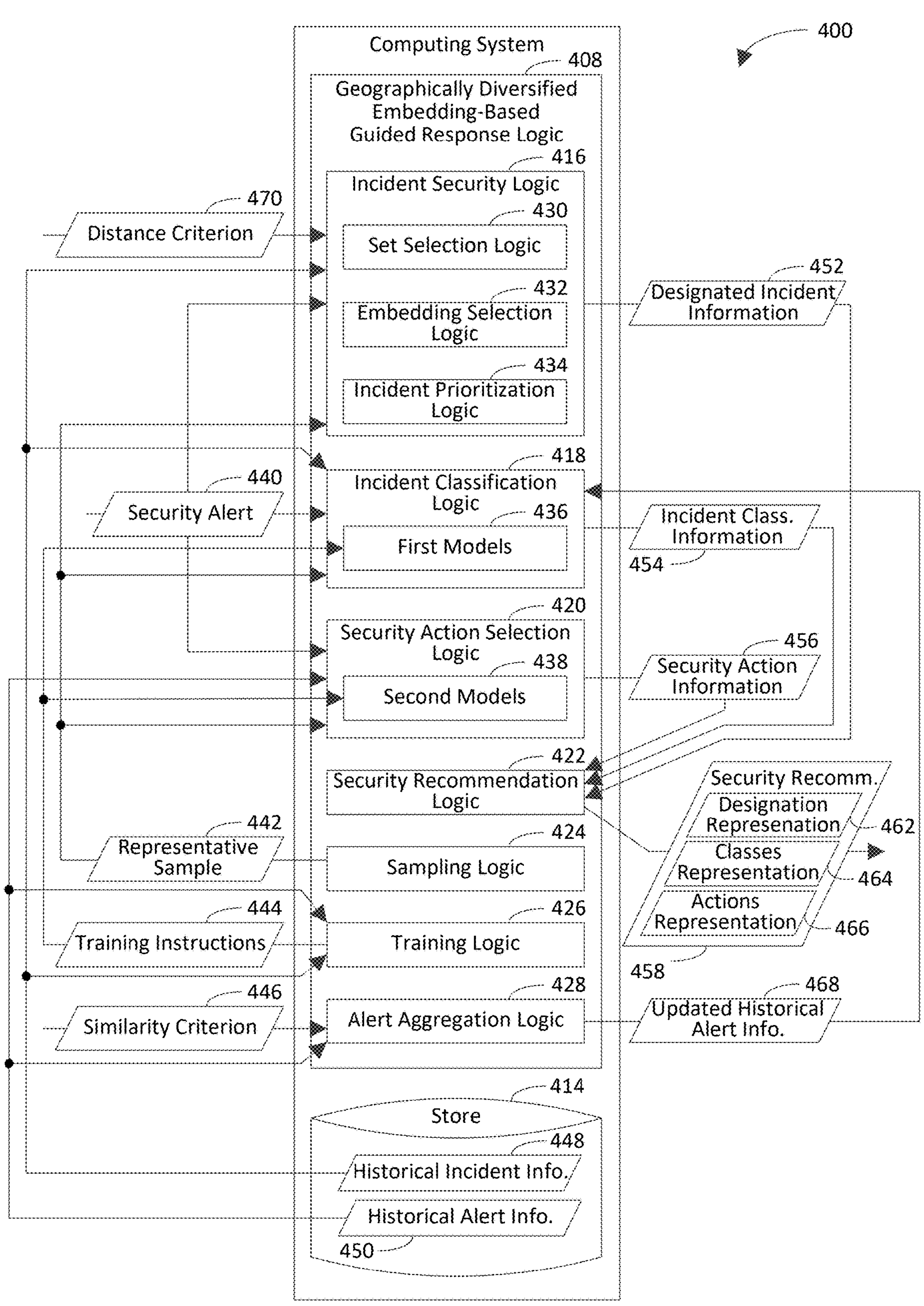
FIG. 4 is a block diagram of an example computing system in accordance with an embodiment.

FIG. 2 depicts a flowchart 200 of an example method for providing a geographically diversified embedding-based guided response to a security alert in accordance with an embodiment. FIG. 3 depicts a flowchart 300 of an example method for selecting a set of designated security incidents from a set of historical security incidents associated with a geographical region in accordance with an embodiment. Flowcharts 200 and 300 may be performed by the servers 106A-106N shown in FIG. 1, for example. For illustrative purposes, flowcharts 200 and 300 are described with respect to a computing system 400 shown in FIG. 4, which is an example implementation of the servers 106A-106N. As shown in FIG. 4, the computing system 400 includes geographically diversified embedding-based guided response logic 408 and a store 414. The geographically diversified embedding-based guided response logic 408 includes incident security logic 416, incident classification logic 418, security action selection logic 420, security recommendation logic 422, sampling logic 424, training logic 426, and alert aggregation logic 428. The incident security logic 416 includes set selection logic 430, embedding selection logic 432, and incident prioritization logic 434. The incident classification logic 418 includes first models 436, which are associated with respective geographical regions (e.g., respective geographical regions 112A-112N). For instance, the first models 436 may be included in the respective guided response components 110A-110N shown in FIG. 1. The security action selection logic 420 includes second models 438, which are associated with the respective geographical regions. For instance, the second models 438 may be included in the respective guided response components 110A-110N shown in FIG. 1. The store 414 may be any suitable type of store. One type of store is a database. For instance, the store 414 may be a relational database, an entity-relationship database, an object database, an object relational database, an extensible markup language (XML) database, etc. The store 414 is shown to store historical incident information 448 and historical alert information 450 for non-limiting, illustrative purposes. Further structural and operational embodiments will be apparent to persons skilled in the relevant art(s) based on the discussion regarding flowcharts 200 and 300.

As shown in FIG. 2, the method of flowchart 200 begins at step 202. In step 202, a security alert regarding an identified security incident that is associated with an entity is received. In an aspect, the security alert is user-generated, meaning that the security alert is generated by a user (e.g., an information technology (IT) professional or an end user). In another aspect, the security alert is machine-generated, meaning that the security alert is generated by a machine (e.g., computing system). The machine may be a physical machine or a virtual machine. In accordance with this aspect, the security alert may be initiated by a computer software program that executes on the machine. The security alert may be manually initiated or automatically initiated. Examples of an entity include but are not limited to a user, an application, a computing system, an Internet Protocol (IP) address, a file, and a folder. In an example implementation, the incident security logic 416, the incident classification logic 418, and/or the security action selection logic 420 receives a security alert 440 regarding the identified security incident that is associated with the entity.

At step 204, sets of designated security incidents are selected from sets of historical security incidents associated with respective geographical regions as a result of distances between a first embedding and sets of designated embeddings satisfying a distance criterion. In an aspect, the distance criterion requires the distances between the first embedding and the sets of designated embeddings to be less than or equal to distances between the first embedding and sets of other embeddings. The first embedding represents the identified security incident. The sets of designated embeddings represent the sets of designated security incidents. The sets of other embeddings represent sets of other security incidents in the sets of historical security incidents. An embedding (a.k.a. feature vector) is a numerical representation of data (e.g., an identified security incident or a historical security incident). For instance, the embedding may be generated by converting the data (e.g., text) into a vector (e.g., an array of numbers). In an aspect, the embedding represents the meaning and the context of the data.

An embedding of a security incident may be based on any of a variety of features of the security incident. Examples of a feature of a security incident include but are not limited to an organization identifier ("OrgId"), an organizationally unique incident identifier ("IncidentId"), a unique identifier for each OrgId-IncidentId pair ("Id"), a unique identifier for an alert ("AlertId"), a time instance at which the alert was created ("Timestamp"), an identifier (e.g., a unique identifier) for a product that generates the alert ("AlertProduct"), a unique identifier for the alert generating detector ("DetectorId"), a title of the alert ("AlertTitle"), a category of the alert ("Category"), MITRE ATT&CK technique(s) involved in the alert ("MitreTechniques"), an indication whether the detector is build-in or custom ("IsBuiltInDetector"), an SOC grade assigned to the incident ("IncidentGrade"), a recommended grade for the incident ("RecommendedGrade"), a recommendation to remediate the incident ("RecommendedAction"), a high-level SOC alert remediation action ("ActionGrouped"), a fine-grain SOC alert remediation action ("ActionGranular"), a type of entity involved in the alert ("EntityType"), a role of the evidence in the investigation ("EvidenceRole"), additional metadata on the evidence role in the alert ("Roles"), a unique identifier for the device ("DeviceId"), a name of the device ("DeviceName"), a SHA-256 hash of the file ("Sha256"), an IP address that is involved ("IpAddress"), a URL that is involved ("Url"), an on-premises account identifier ("AccountSid"), an Email account identifier ("AccountUpn"), an identifier for a security computer program account ("AccountObjectId"), a name of the on-premises account ("AccountName"), an organization-level identifier for an email message ("NetworkMessageId"), a unique identifier for the email cluster ("EmailClusterId"), a registry key that is involved "RegistryKey"), a name of the registry value ("Registry ValueName"), data of the registry value ("Registry ValueData"), a unique identifier for the application ("ApplicationId"), a name of the application ("ApplicationName"), an OAuth application identifier ("OAuthApplicationId"), a malware family associated with a file ("ThreatFamily"), a name of the file ("FileName"), a path of the file folder ("FolderPath"), a name of a resource ("ResourceName"), a type of a resource ("ResourceType"), a family of the operating system ("OSFamily"), a version of the operating system ("OSVersion"), a direction of the antispam filter ("AntispamDirection"), a level of suspicion ("SuspicionLevel"), a final verdict of the threat analysis ("LastVerdict"), a country code of a country in which evidence appears ("CountryCode"), a state in which evidence appears ("State"), and a city in which evidence appears ("City").

The distance between a first identified embedding (e.g., the first embedding mentioned above) and a second identified embedding (e.g., an embedding of a historical security incident (a.k.a. a historical embedding)) may be any suitable type of distance, including but not limited to a Euclidian distance (a.k.a. Pythagorean distance), a Manhattan distance, or a Cosine distance. A Euclidian distance between two vectors is the length of the shortest line between the vectors. For example, the Euclidian distance, $D_E$, between two 2-dimensional vectors (a, b) and (x, y) may be represented as $D_E$=[(a−x)^2+(b−y)^2]^(½). In another example, the Euclidian distance, $D_E$, between two 3-dimensional vectors (a, b, c) and (x, y, z) may be represented as $D_E$=[(a−x)^2+(b−y)^2+(c−z)^2]^(½). A Manhattan distance between two vectors is a sum of absolute differences between corresponding components of the vectors. For example, the Manhattan distance, $D_M$, between two 2-dimensional vectors (a, b) and (x, y) may be represented as $D_M$=Abs(a−x)+Abs(b−y). In another example, the Manhattan distance, $D_M$, between two 3-dimensional vectors (a, b, c) and (x, y, z) may be represented as $D_M$=Abs(a−x)+Abs(b−y)+Abs(c−z). A Cosine distance between two vectors is equal to a dot product of the vectors divided by a product of the magnitudes of the vectors. Accordingly, the Cosine distance, $D_C$, between vectors X and Y may be represented as $D_C$=(X·Y)/(||X||*||Y||).

The distance between the first identified embedding and the second identified embedding corresponds to a strength of a relationship (e.g., similarity) between first underlying data (e.g., the identified security incident) represented by the first identified embedding and second underlying data (e.g., the historical security incident) represented by the second identified embedding. For instance, the distance being relatively shorter indicates that the first underlying data represented by the first identified embedding corresponds to the second underlying data represented by the second identified embedding to a relatively greater extent (i.e., indicates a greater similarity between the first underlying data and the second underlying data), whereas the distance being relatively longer indicates that the first underlying data represented by the first identified embedding corresponds to the second underlying data represented by the second identified embedding to a relatively lesser extent (i.e., indicates a lesser similarity between the first underlying data and the second underlying data).

In an example implementation, the set selection logic 430 selects the sets of designated security incidents from the sets of historical security incidents associated with the respective geographical regions as a result of the distances between the first embedding and the sets of designated embeddings satisfying a distance criterion 470 (e.g., being less than or equal to the distances between the first embedding and the sets of other embeddings). In an aspect, the incident security logic 416 analyzes the historical incident information 448 to identify the sets of historical security incidents. For instance, the historical incident information 448 may indicate that a first set of historical security incidents is associated with a first geographical region, a second set of historical security incidents is associated with a second geographical region, and so on. In an example of this aspect, the incident security logic 416 generates sets of second embeddings, which represent the sets of historical security incidents. The sets of second embeddings include the sets of designated embeddings and the sets of other embeddings. For instance, a first set of second embeddings includes a first set of designated embeddings and a first set of other embeddings, a second set of second embeddings includes a second set of designated embeddings and a second set of other embeddings, and so on. The first set of second embeddings is associated with the first geographical region, the second set of second embeddings is associated with the second geographical region, and so on. Accordingly, the sets of historical security incidents include the sets of designated security incidents and the sets of other security incidents. In further accordance with this example, the incident security logic 416 generates the first embedding, which represents the identified security incident. In another example of this aspect, the first models 436 generate the first embedding and the sets of second embeddings as described above, and the incident security logic 416 receives the first embedding and the sets of second embeddings from the first models 436.

The incident security logic 416 (e.g., the set selection logic 430 therein) generates designated incident information 452, which indicates (e.g., specifies or describes) the sets of designated security incidents. For instance, the designated incident information 452 may distinguish the sets of designated security incidents from the other security incidents. In an aspect, the designated incident information 452 associates (e.g., cross-references) the sets of designated security incidents with the respective geographical regions. In another aspect, the designated incident information 452 includes an explanation of reasoning for selecting the sets of designated security incidents from the sets of historical security incidents associated with the respective geographical regions.

At step 206, the identified security incident is classified into selected classes, which are selected from a plurality of classes, by applying the first embedding, which represents the identified security incident, to first models that are trained to map sets of second embeddings to corresponding sets of classes of the plurality of classes. The sets of second embeddings represent the sets of historical security incidents associated with the respective geographical regions. The plurality of classes correspond to validity of security concerns and/or maliciousness of actions that result in the security concerns. A security concern is an indication of a potential security threat to a system and/or a user of the system. Validity of the security concern is an indication whether the potential security threat is a security threat to the system and/or the user of the system. In an aspect, the validity of the security concern represents a likelihood (e.g., a statistical probability) that the potential security threat is a security threat. A security threat to a system and/or a user of the system is an occurrence (e.g., an action or an absence of action) that is capable of causing or facilitating harm to the system and/or the user of the system. Maliciousness of an action that results in a security concern with regard to a system and/or a user of the system indicates an extent of harm that the action is potentially capable of causing to the system and/or the user. For instance, the maliciousness of the action may be based at least on a number of systems, resources therein, or users of the system or resource(s) therein that the action is potentially capable of harming; an amount of damage that the action is potentially capable of causing to the system, the resource(s), or the user(s); an extent of remedial actions that are potentially necessitated to remediate the harm caused by the action, and so on. The extent of harm that an action is potentially capable of causing to a system and/or a user may be determined (e.g., estimated or calculated) by identifying extent(s) of harm that historical action(s) that are similar to the action caused to a system and/or a user of the system. Similarity of the historical action(s) to the action may be determined using any suitable similarity determination technique (e.g., a Euclidean, Manhattan, or cosine similarity technique). In an aspect, the identified security incident is classified into selected classes in real-time (e.g., on-the-fly).

In an example implementation, the incident classification logic 418 classifies the identified security incident into the selected classes by applying the first embedding, which represents the identified security incident, to the first models 436. The first models 436 are trained to map the sets of second embeddings to the corresponding sets of classes (e.g., using heuristic(s)). The incident classification logic 418 generates incident classification information 454, which indicates the selected classes into which the identified security incident is classified. In an aspect, the incident classification information 454 associates (e.g., cross-references) the selected classes with the respective geographical regions. For instance, the incident classification information 454 may indicate that the identified security incident is classified into a first selected class with regard to the first geographical region, the identified security incident is classified into a second selected class with regard to the second geographical region, and so on. Any two or more of the selected classes may be the same or different. In an aspect, the incident classification information 454 includes an explanation of reasoning for classifying the identified security incident into the selected classes.

In an example embodiment, the plurality of classes comprises at least a false positive class, a true positive class, and a benign positive class. The false positive class corresponds to an invalid security concern. The true positive class corresponds to a valid security concern resulting from an action that is deemed malicious. The benign positive class corresponds to a valid security concern resulting from an action that is deemed benign (i.e., not malicious). In an aspect of this embodiment, the security actions are selected from the plurality of possible security actions as a result of each of the selected classes being the true positive class.

In another example embodiment, the sets of historical security incidents associated with the respective geographical regions correspond to a predefined, fixed period of time. For instance, the predefined, fixed period of time may be a most recent 90 days, a most recent 180 days, or a most recent one year.

In yet another example, the sets of historical security incidents associated with respective geographical regions are limited to a predefined, fixed number of historical security incidents (e.g., 100, 500, or 1000 historical security incidents in each set).

At step 208, security actions (e.g., containment actions or remediation actions) are selected from a plurality of possible security actions. The security actions are to be performed with regard to the entity in the respective geographical regions by applying a third embedding, which represents the security alert, to second models. A security action is an action that is configured to increase security of an entity (e.g., a system and/or a user of the system). Examples of a security action include but are not limited to isolating a machine, containing (e.g., quarantining) a user, containing an account, quarantining a file, and stopping a virtual machine. For instance, the machine (e.g., physical machine or virtual machine), the user, the account, and/or the file may be associated with the security alert and/or the security incident. The second models are trained to map sets of fourth embeddings to corresponding sets of security actions. The fourth embeddings represent sets of historical security alerts associated with the respective geographical regions. In an aspect, the security actions are selected from the plurality of possible security actions in real-time (e.g., on-the-fly).

In an example implementation, the security action selection logic 420 selects the security actions from the plurality of possible security actions. In accordance with this implementation, the security actions are to be performed with regard to the entity in the respective geographical regions by applying a third embedding, which represents the security alert 440, to the second models 438. For instance, the security action selection logic 420 may select a first security action to be performed with regard to the entity in the first geographical region, a second security action to be performed with regard to the entity in the second geographical region, and so on. Any two or more of the security actions may be the same or different.

The second models 438 are trained to map the sets of fourth embeddings to the corresponding sets of security actions (e.g., using heuristic(s)). In an aspect, the security action selection logic 420 analyzes the historical alert information 450 to identify the historical security alerts. For instance, the historical alert information 450 may indicate that a first set of historical security alerts is associated with a first geographical region, a second set of historical security alerts is associated with a second geographical region, and so on. In an example of this aspect, the security action selection logic 420 generates the sets of fourth embeddings, which represent the sets of historical security alerts. For instance, a first set of fourth embeddings is associated with the first geographical region, a second set of fourth embeddings is associated with the second geographical region, and so on.

The security action selection logic 420 generates security action information 456, which indicates the security actions that are selected to be performed with regard to the entity in the respective geographical regions. In an aspect, the security action information 456 includes an explanation of reasoning for selecting the security actions from the plurality of possible security actions.

In an example embodiment, the sets of historical security alerts associated with the respective geographical regions correspond to a predefined, fixed period of time. For instance, the predefined, fixed period of time may be a most recent 90 days, a most recent 180 days, or a most recent one year.

In another example embodiment, the sets of historical security alerts associated with the respective geographical regions are limited to a predefined, fixed number of historical security alerts (e.g., 100, 500, or 1000 historical security alerts in each set).

At step 210, execution of a computer-executable instruction is triggered (e.g., automatically triggered). The execution of the computer-executable instruction causes a security recommendation regarding the security alert to be generated. A security recommendation is a recommendation of action (s) to be performed to address (e.g., investigate, triage, mitigate, contain, and/or remediate) a security alert. The security recommendation includes a representation (e.g., indication or description) of the sets of designated security incidents, a representation of the selected classes into which the identified security incident is classified, and/or a representation of the security actions to be performed with regard to the entity in the respective geographical regions. In an example implementation, the security recommendation logic 422 triggers the execution of the computer-executable instruction that causes a security recommendation 458 regarding the security alert 440 to be generated. The security recommendation 458 includes a designation representation 462, a classes representation 464, and/or an actions representation 466. The designation representation 462 is a representation of the sets of designated security incidents. The designation representation 462 may indicate (e.g., identify) the geographical regions with which the sets of designated security incidents are associated. The designation representation 462 may include the explanation of the reasoning for the sets of designated security incidents being selected from the sets of historical security incidents associated with the respective geographical regions. The classes representation 464 is a representation of the selected classes into which the identified security incident is classified. The classes representation 464 may indicate the geographical regions with which the selected classes are associated. The classes representation 464 may include the explanation of the reasoning for the identified security incident being classified into the selected classes. The actions representation 466 is a representation of the security actions that are to be performed with regard to the entity in the respective geographical regions. For instance, the actions representation 466 may associate (e.g., cross-reference) the security actions with the respective geographical regions in which the security actions are to be performed. The actions representation 466 may include the explanation of the reasoning for the security actions being selected from the plurality of possible security actions.

In an aspect of this implementation, the security recommendation logic 422 analyzes the designated incident information 452 to determine (e.g., identify) the sets of designated security incidents, the respective geographical regions with which the sets of designated security incidents are associated, and/or the explanation of the reasoning for the sets of designated security incidents being selected from the sets of historical security incidents associated with the respective geographical regions. In another aspect, the security recommendation logic 422 analyzes the incident classification information 454 to determine the selected classes into which the identified security incident is classified, the respective geographical regions with which the selected classes are associated, and/or the explanation of the reasoning for the identified security incident being classified into the selected classes. In yet another aspect, the security recommendation logic 422 analyzes the security action information 456 to determine the security actions that are to be performed with regard to the entity in the respective geographical regions and/or the explanation of the reasoning for the security actions being selected from the plurality of possible security actions.

In an example embodiment, the representation of the sets of designated security incidents in the security recommendation is an aggregation of the sets of designated security incidents that is agnostic with regard to geographical region.

In another example embodiment, the representation of the selected classes into which the identified security incident is classified is a mode of the selected classes. In yet another example embodiment, the representation of the security actions to be performed with regard to the entity in the respective geographical regions is an aggregation of the security actions that is agnostic with regard to geographical region.

In still another example embodiment, step 204 of flowchart 200 includes one or more of the steps shown in flowchart 300 of FIG. 3, which depicts selection of a first set of designated security incidents from a first set of historical security incidents associated with a first geographical region. As shown in FIG. 3, the method of flowchart 300 begins at step 302. In step 302, a first number of designated security incidents are selected from the first set of historical security incidents to be included in the first set of designated security incidents. The first number of designated security incidents are selected as a result of the designated embeddings of the first number of designated security incidents and the first embedding being same and further as a result of the first number of designated security incidents corresponding to a common class of the plurality of classes. In an example implementation, the embedding selection logic 432 selects the first number of designated security incidents from the first set of historical security incidents to be included in the first set of designated security incidents.

At step 304, a second number of designated security incidents are selected from the first set of historical security incidents to be included in the first set of designated security incidents. The second number of designated security incidents are selected as a result of the designated embeddings of the second number of designated security incidents and the first embedding being same and further as a result of the first number of designated security incidents corresponding to different classes of the plurality of classes. In an example implementation, the embedding selection logic 432 selects the second number of designated security incidents from the first set of historical security incidents to be included in the first set of designated security incidents.

At step 306, a third number of designated security incidents are selected from the first set of historical security incidents to be included in the first set of designated security incidents. The third number of designated security incidents are selected as a result of the designated embeddings of the third number of designated security incidents being different from the first embedding. In an example implementation, the embedding selection logic 432 selects the third number of designated security incidents from the first set of historical security incidents to be included in the first set of designated security incidents.

In an aspect of this embodiment, a number of the designated security incidents in the first set is limited to a threshold number. In an example of this aspect, the threshold number is equal to a sum of the first number and the second number. In accordance with this example, step 306 is not performed. In another example of this aspect, the threshold number is equal to a sum of the first number, the second number, and the third number. In accordance with this example, step 306 is performed.

In an example embodiment, the embeddings described herein incorporate an identifier associated with a particular tenant (e.g., customer or organization). Accordingly, the methods of flowcharts 200 and 300 may be configured to implement preferences of the tenant. In an aspect of this embodiment, as strength of a signal from the particular tenant decreases, behavior associated with an operation related to the signal may default to global behavior, which is agnostic with regard to the particular tenant, for the geographical region in which the operation is performed. The signal strength may be based on (e.g., based at least in part on) any of a variety of suitable factors, including but not limited to an amount of time consumed since generation of the signal and/or an amount of data relevant to a security incident or a security alert with which the operation is associated.

In some example embodiments, one or more steps 202, 204, 206, 208, and/or 210 of flowchart 200 may not be performed. Moreover, steps in addition to or in lieu of steps 202, 204, 206, 208, and/or 210 may be performed. For instance, in an example embodiment, the method of flowchart 200 further includes selecting a predefined, fixed number of designated embeddings from a corpus of embeddings that represents a specified corpus of historical security incidents associated with a specified geographical region to define a specified set of designated embeddings associated with the specified geographical region as a result of distances between the first embedding and the designated embeddings in the specified set being less than or equal to distances between the first embedding and other embeddings in the corpus of embeddings. In an example implementation, the embedding selection logic 432 selects the predefined, fixed number of designated embeddings from the corpus of embeddings that represents the specified corpus of historical security incidents associated with the specified geographical region to define the specified set of designated embeddings associated with the specified geographical region.

In another example embodiment, the method of flowchart 200 further includes selecting a representative sample of a plurality of historical security incidents associated with a specified geographical region to define a specified set of historical security incidents associated with the specified geographical region by comparing a plurality of embeddings that represent the plurality of historical security incidents, the representative sample comprising fewer than all of the plurality of historical security incidents. In an example implementation, the sampling logic 424 selects a representative sample 442 of the plurality of historical security incidents associated with the specified geographical region to define the specified set of historical security incidents associated with the specified geographical region.

In yet another example implementation, the method of flowchart 200 further includes training the first models to map the sets of second embeddings to the corresponding sets of classes using a random forest technique. In an example implementation, the training logic 426 trains the first models 436 to map the sets of second embeddings to the corresponding sets of classes using a random forest technique. For instance, the training logic 426 may provide training instructions 444, which are configured to train the first models 436, to the first models 436.

In still another example implementation, the method of flowchart 200 further includes generating a specified set of second embeddings that represents a specified set of historical security incidents associated with a specified geographical region by combining features of the specified set of historical security incidents that occur fewer than a threshold number of times in the specified set of historical security incidents into a common value in the specified set of second embeddings. In an example implementation, the incident security logic 416 and/or the incident classification logic 418 (e.g., the first models 436 therein) generate the specified set of second embeddings that represents the specified set of historical security incidents associated with the specified geographical region. In accordance with this embodiment, selecting the sets of designated security incidents from the sets of historical security incidents associated with the respective geographical regions at step 204 includes, as a result of combining the features of the specified set of historical security incidents that occur fewer than the threshold number of times in the specified set of historical security incidents into the common value in the specified set of second embeddings, selecting a first set of designated security incidents from the specified set of historical security incidents associated with the specified geographical region.

In another example embodiment, the method of flowchart 200 further includes generating a specified set of second embeddings that represents a specified set of historical security incidents associated with a specified geographical region by configuring the specified set of second embeddings to represent a predefined, fixed number of features of the specified set of historical security incidents. For instance, configuring the specified set of second embeddings to represent the predefined, fixed number of features of the specified set of historical security incidents includes reducing a number of features of the specified set of historical security incidents that are represented by the specified set of second embeddings to the predefined, fixed number. In an aspect, the specified set of second embeddings is generated by configuring the specified set of second embeddings to represent the predefined, fixed number of features of the specified set of historical security incidents using a principal component analysis (PCA) technique. A PCA technique is a linear dimensionality reduction technique that transforms a relatively large set of variables into a smaller set of summary indices, which are referred to a "principal components," while retaining a substantial amount (e.g., proportion) of information regarding the relatively large set of variables. In an example implementation, the incident security logic 416 and/or the incident classification logic 418 (e.g., the first models 436 therein) generates the specified set of second embeddings that represents the specified set of historical security incidents associated with the specified geographical region.

In yet another example embodiment, the method of flowchart 200 further includes generating a second embedding that represents a historical security incident in a set of historical incidents associated with a specified geographical region by arranging identifiers, which identify detectors that generate alerts that are included in (e.g., define) the historical security incident, into an ordered list and hashing the ordered list. For instance, the ordered list may be hashed using a secure hash algorithm (SHA) technique. A SHA technique is a hashing technique that uses a cryptographic hash function(s) to transform data in accordance with a SHA standard published by the National Institute of Standards and Technology (NIST). Examples of a SHA standard include but are not limited to SHA-0, SHA-1, SHA-2, and SHA-3. The cryptographic hashing function may include bitwise operations, modular additions, and/or compression functions. In an example implementation, the incident security logic 416 and/or the incident classification logic 418 (e.g., the first models 436 therein) generates the second embedding that represents the historical security incident in the set of historical incidents associated with the specified geographical region by arranging the identifiers into the ordered list and further by hashing the ordered list.

In still another example embodiment, the method of flowchart 200 further includes selecting a representative sample of a plurality of historical security alerts associated with a specified geographical region to define a specified set of historical security alerts associated with the specified geographical region by comparing a plurality of embeddings that represent the plurality of historical security alerts. The representative sample includes fewer than all of the plurality of historical security alerts. In an example implementation, the sampling logic 424 selects a representative sample 442 of the plurality of historical security alerts associated with the specified geographical region to define the specified set of historical security alerts associated with the specified geographical region. The representative sample 442 includes fewer than all of the plurality of historical security alerts.

In an example embodiment, the method of flowchart 200 further includes training the second models to map the sets of fourth embeddings to the corresponding sets of security actions using a random forest technique. In an example implementation, the training logic 426 trains the second models 438 to map the sets of fourth embeddings to the corresponding sets of security actions using a random forest technique. For instance, the training logic 426 may provide training instructions 444, which are configured to train the second models 438, to the first models 438.

In another example embodiment, the method of flowchart 200 further includes generating a specified set of fourth embeddings that represents a specified set of historical security alerts associated with a specified geographical region by combining features of the specified set of historical security alerts that occur fewer than a threshold number of times in the specified set of historical security alerts into a common value in the specified set of fourth embeddings. In an example implementation, the security action selection logic 420 (e.g., the second models 438 therein) generate the specified set of fourth embeddings that represents the specified set of historical security alerts associated with the specified geographical region. In accordance with this embodiment, selecting the security actions from the plurality of possible security actions to be performed with regard to the entity in the respective geographical regions at step 208 includes, as a result of combining the features of the specified set of historical security alerts that occur fewer than the threshold number of times in the specified set of historical security alerts into the common value in the specified set of fourth embeddings, selecting a first security action from the plurality of possible security actions to be performed with regard to the entity in the specified geographical region.

In yet another example embodiment, the method of flowchart 200 further includes generating a specified set of fourth embeddings that represents a specified set of historical security alerts associated with a specified geographical region by configuring the specified set of fourth embeddings to represent a predefined, fixed number of features of the specified set of historical security alerts. For instance, configuring the specified set of fourth embeddings to represent the predefined, fixed number of features of the specified set of historical security alerts includes reducing a number of features of the specified set of historical security alerts that are represented by the specified set of fourth embeddings to the predefined, fixed number. In an aspect, the specified set of fourth embeddings is generated by configuring the specified set of fourth embeddings to represent the predefined, fixed number of features of the specified set of historical security alerts using a PCA technique. In an example implementation, the security action selection logic 420 (e.g., the second models 438 therein) generates the specified set of fourth embeddings that represents the specified set of historical security alerts associated with the specified geographical region.

In still another example embodiment, the method of flowchart 200 further includes providing a set of historical security alerts associated with a specified geographical region by aggregating multiple historical security alerts, which are included in a corpus of historical security alerts associated with the specified geographical region, into a single representative historical security alert as a result of identifiers that identify the multiple historical security alerts satisfying a similarity criterion. For instance, the similarity criterion may require the identifiers that identify the multiple historical security alerts to be the same. In an example implementation, the alert aggregation logic 428 provides the set of historical security alerts associated with the specified geographical region by aggregating the multiple historical security alerts into the single representative historical security alert as a result of identifiers that identify the multiple historical security alerts satisfying a similarity criterion 446. The alert aggregation logic 428 generates updated historical alert information 468, which indicates (e.g., identifies or includes) the set of historical security alerts. In accordance with this embodiment, the method of flowchart 200 further includes generating a set of historical security incidents associated with the specified geographical region by incorporating the representative historical security alert into the set of historical security incidents. In an example implementation, the incident security logic 416 and/or the incident classification logic 418 (e.g., the first models 436 therein) generates the set of historical security incidents associated with the specified geographical region by incorporating the representative historical security alert into the set of historical security incidents.

In another example embodiment, the method of flowchart 200 further includes assigning priorities to the designated security incidents in the sets of designated security incidents. The priorities correspond to likelihoods of the designated security incidents to cause damage to a system. In an example implementation, the incident prioritization logic 434 assigns the priorities to the designated security incidents in the sets of designated security incidents. In accordance with this embodiment, the representation of the sets of designated security incidents indicates the priorities. In an example implementation, the designation representation 462 indicates the priorities.

Any one or more of the incident security logic 416 (e.g., the set selection logic 430, the embedding selection logic 432, and/or the incident prioritization logic 434 therein), the incident classification logic 418 (e.g., the first models 436 therein), the security action selection logic 420 (e.g., the second models 438 therein), the security recommendation logic 422, the sampling logic 424, and/or the alert aggregation logic 428 may be implemented using artificial intelligence (AI). For instance, any one or more of the aforementioned components of the geographically diversified embedding-based guided response logic 408 may be implemented using an AI model.

AI is intelligence of a machine (e.g., a computing system) and/or code (e.g., software and/or firmware), as opposed to intelligence of a living creature (e.g., a human). An AI model is a model that utilizes AI to generate an answer that is responsive to an AI prompt (a.k.a. prompt) that is received by the AI model. The AI model may be an artificial general intelligence model. An artificial general intelligence model is an AI model (e.g., an autonomous AI model) that is configured to be capable of performing any task that an intelligent being (e.g., a human) is capable of performing. In an example implementation, the artificial general intelligence model is capable of performing a task that surpasses the capabilities of an animal.

An AI prompt indicates (e.g., specifies) a task that is to be performed by an AI model. Examples of an AI prompt include but are not limited to a zero-shot prompt, a one-shot prompt, and a few-shot prompt. A zero-shot prompt is a prompt for which the prompt and/or its corresponding contextual information, which are to be processed by the AI model, is not included in pre-trained knowledge of the AI model. A one-shot prompt is a prompt that includes a target prompt along with a single example prompt and a single example answer that is responsive to the single example prompt. The example prompt and the example answer provide guidance as to how the AI model is expected to respond to the target prompt. A few-shot prompt is a prompt that includes a target prompt along with multiple example prompts and multiple example answers that are responsive to the respective example prompts. The example prompts and the example answers provide guidance as to how the AI model is expected to respond to the target prompt.

An AI prompt may be a natural language prompt. A natural language prompt is a prompt that is written in a natural language. A natural language is a human language that has developed through use and repetition. For instance, the natural language may have developed naturally without conscious planning or premeditation. Examples of a natural language include English, French, Spanish, and Mandarin. In an aspect, the natural language prompt is generated by a user (e.g., a human). In another aspect, the natural language prompt is generated by a computing system (e.g., an AI assistant that runs on the computing system).

An AI prompt may not be written in a natural language. For instance, the AI prompt may include (e.g., be) computer code. The AI prompt may be any suitable sequence of characters that is capable of being interpreted by an AI model.

In a first example AI embodiment, the set selection logic 430 includes (e.g., is) an AI model that is configured to analyze (e.g., develop and/or refine an understanding of) the first embedding, which represents the identified security incident, sets of historical embeddings (including the sets of designated embeddings and the sets of other embeddings), which represent the historical security incidents, relationships between any of the foregoing, and confidences in those relationships. For example, the set selection logic 430 is configured to compare attributes of the first embedding, the sets of historical embeddings, and contextual information (which may include sample first embeddings of sample identified security incident(s) and sample historical embeddings of sample historical security incidents) using artificial intelligence to determine the sets of designated security incidents that are to be selected from the sets of historical security incidents at step 204 shown in FIG. 2.

In a second example AI embodiment, the incident classification logic 418 (e.g., one or more of the first models 436 therein) includes (e.g., is) an AI model that is configured to analyze (e.g., develop and/or refine an understanding of) the first embedding, the sets of historical embeddings (including the sets of designated embeddings and the sets of other embeddings), information about the plurality of classes, relationships between any of the foregoing, and confidences in those relationships. For example, the incident classification logic 418 (e.g., one or more of the first models 436 therein) is configured to compare attributes of the first embedding, the sets of historical embeddings, the information about the plurality of classes, and contextual information (which may include sample first embedding(s) of sample identified security incident(s), sample historical embeddings of sample historical security incidents, and information about sample classes) using artificial intelligence to classify the identified security incident into the selected classes at step 206 shown in FIG. 2.

In accordance with the second example AI embodiment, the identified security incident is classified into the selected classes at step 206 using any suitable classification technique(s). Examples of a classification technique include but are not limited to a logistic regression technique, a decision tree technique, a random forest technique, a support vector machines (SVM) technique, a naïve Bayes technique, a k-nearest neighbors (k-NN) technique, a neural network technique, a gradient boosting machines (GBM) technique, an AdaBoost technique, and an XGBoost technique.

A logistic regression technique is a classification technique that estimates the probability that a given input belongs to a certain class. The logistic regression technique uses the logistic (i.e., sigmoid) function to map predicted values to probabilities between 0 and 1, fitting the data with a linear decision boundary.

A decision tree technique is a classification technique that generates a decision tree by splitting data into subsets based on feature values. Each internal node of the decision tree represents a feature; each branch represents a decision rule; and each leaf node represents an outcome.

A random forest technique is a classification technique in which multiple decision trees are built during training, and the class that is the mode of the classes (classification) or the mean prediction (regression) of the individual trees is provided as an output. The random forest technique reduces overfitting by averaging multiple trees.

An SVM technique is a classification technique in which a hyperplane or a set of hyperplanes is constructed in a high-dimensional space to separate different classes with maximum margin. The best hyperplane is the one that maximizes the distance (i.e., margin) between the nearest points (i.e., support vectors) of the different classes.

A naïve Bayes technique is a classification technique that uses a probabilistic classifier based on Bayes' theorem with strong (i.e., naïve) independence assumptions between the features. The naïve Bayes technique calculates the posterior probability for each class and assigns the class with the highest posterior probability to the instance.

A k-nearest neighbors technique is a non-parametric classification technique that measures the distance between a query point and a set of labeled points, using a majority vote of the query point's k nearest neighbors to determine the class into which the query point is to be classified. The k-nearest neighbors technique may use any suitable distance metrics (e.g., Euclidean, Manhattan, or cosine similarity).

A neural network technique is a classification technique that uses models, which include layers of interconnected nodes (a.k.a. neurons), to perform classification. Each connection has a weight that adjusts as learning proceeds. Nodes are arranged in layers: input, hidden, and output. Learning is performed in the neural network technique by adjusting weights to minimize error of predictions.

A GBM technique is an iterative classification technique that combines weak learners (e.g., decision trees) such that each subsequent learner attempts to correct the errors of the previous learner(s), optimized by a gradient descent algorithm.

An AdaBoost technique is a classification technique that combines multiple weak classifiers such that each subsequent classifier focuses on instances that were misclassified by previous classifier(s). For instance, weights of instances that are misclassified by a classifier may be adjusted (e.g., increased) to enable subsequent classifier(s) to focus more on those instances.

An XGBoost technique is a classification technique that uses an enhanced gradient boosting algorithm optimized for speed and performance, implementing parallel processing, tree pruning, and handling missing values. Efficiency of the XGBoost technique may be more evident with relatively large datasets.

In a third example AI embodiment, the security action selection logic 420 (e.g., one or more of the second models 438 therein) includes (e.g., is) an AI model that is configured to analyze (e.g., develop and/or refine an understanding of) the third embedding, which represents the security alert, the sets of fourth embeddings, which represent the sets of historical security alerts associated with the respective geographical regions, information about the plurality of possible security actions, relationships between any of the foregoing, and confidences in those relationships. For example, security action selection logic 420 (e.g., one or more of the second models 438 therein) is configured to compare attributes of the third embedding, the sets of fourth embeddings, the information about the plurality of possible security actions, and contextual information (which may include sample third embedding(s) of sample security alert(s), sample fourth embeddings of sample historical security alerts, and information about sample possible security actions) using artificial intelligence to determine the security actions that are to be selected from the plurality of possible security actions at step 208 shown in FIG. 2.

In some example embodiments, any one or more of the incident security logic 416 (e.g., the set selection logic 430, the embedding selection logic 432, and/or the incident prioritization logic 434 therein), the incident classification logic 418 (e.g., one or more of the first models 436 therein), the security action selection logic 420 (e.g., one or more of the second models 438 therein), the security recommendation logic 422, the sampling logic 424, and/or the alert aggregation logic 428 includes a neural network that uses the artificial intelligence to determine (e.g., predict) relationships between at least a subset of its inputs (e.g., the first embedding, the sets of historical embeddings, the information about the plurality of classes, the third embedding, the sets of fourth embeddings, the information about the plurality of possible security actions, and so on), contextual information that includes context regarding the inputs, and confidences in the relationships. The neural network uses those relationships to generate a corresponding output. For example, attributes of the inputs and potentially example inputs may be compared to determine similarities and differences between those attributes. In accordance with this example, the neural network may use those similarities and differences to determine corresponding AI response(s).

In an aspect of the first example AI embodiment, the set selection logic 430 includes a neural network that uses relationships between the first embedding, the sets of historical embeddings, and the contextual information to determine the sets of designated security incidents that are to be selected from the sets of historical security incidents at step 204 shown in FIG. 2. In an aspect of the second example AI embodiment, the incident classification logic 418 (e.g., one or more of the first models 436 therein) includes a neural network that uses relationships between the first embedding, the sets of historical embeddings, the information about the plurality of classes, and the contextual information to classify the identified security incident into the selected classes at step 206 shown in FIG. 2. In an aspect of the third example AI embodiment, the security action selection logic 420 (e.g., one or more of the second models 438 therein) includes a neural network that uses relationships between the third embedding, the sets of fourth embeddings, the information about the plurality of possible security actions, and the contextual information to determine the security actions that are to be selected from the plurality of possible security actions at step 208 shown in FIG. 2.

Examples of a neural network include but are not limited to a feed forward neural network and a transformer-based neural network. A feed forward neural network is an artificial neural network for which connections between units in the neural network do not form a cycle. The feed forward neural network allows data to flow forward (e.g., from the input nodes toward to the output nodes), but the feed forward neural network does not allow data to flow backward (e.g., from the output nodes toward to the input nodes). In an example embodiment, the training logic 426 employs (e.g., includes) a feed forward neural network to train any one or more of the incident security logic 416 (e.g., the set selection logic 430, the embedding selection logic 432, and/or the incident prioritization logic 434 therein), the incident classification logic 418 (e.g., one or more of the first models 436 therein), the security action selection logic 420 (e.g., one or more of the second models 438 therein), the security recommendation logic 422, the sampling logic 424, and/or the alert aggregation logic 428, which are used to determine AI-based confidences. Such AI-based confidences may be used to determine likelihoods that events will occur.

A transformer-based neural network is a neural network that incorporates a transformer. A transformer is a deep learning model that utilizes attention to differentially weight the significance of each portion of sequential input data, such as natural language. Attention is a technique that mimics cognitive attention. Cognitive attention is a behavioral and cognitive process of selectively concentrating on a discrete aspect of information while ignoring other perceivable aspects of the information. Accordingly, the transformer uses the attention to enhance some portions of the input data while diminishing other portions. The transformer determines which portions of the input data to enhance and which portions of the input data to diminish based on the context of each portion. For instance, the transformer may be trained to identify the context of each portion using any suitable technique, such as gradient descent.

In an aspect of the first example AI embodiment, the transformer-based neural network generates an incident similarity model (e.g., to determine sets of designated security incidents that are to be selected from sets of historical security incidents) by utilizing information, such as the first embedding, the sets of historical embeddings, contextual information, relationships between any of the foregoing, and AI-based confidences that are derived therefrom. In an aspect of the second example AI embodiment, the transformer-based neural network generates an incident similarity model (e.g., to classify an identified security incident into selected classes) by utilizing information, such as the first embedding, the sets of historical embeddings, the information about the plurality of classes, contextual information, relationships between any of the foregoing, and AI-based confidences that are derived therefrom. In an aspect of the third example AI embodiment, the transformer-based neural network generates an incident similarity model (e.g., to determine security actions that are to be selected from possible security actions) by utilizing information, such as the third embedding, the sets of fourth embeddings, the information about the plurality of possible security actions, contextual information, relationships between any of the foregoing, and AI-based confidences that are derived therefrom.

In example embodiments, the incident security logic 416 (e.g., the set selection logic 430, the embedding selection logic 432, and/or the incident prioritization logic 434 therein), the incident classification logic 418 (e.g., one or more of the first models 436 therein), the security action selection logic 420 (e.g., one or more of the second models 438 therein), the security recommendation logic 422, the sampling logic 424, and/or the alert aggregation logic 428 includes inference logic. In accordance with these embodiments, the training logic 426 is configured to train an AI algorithm that the inference logic uses to determine (e.g., infer) the AI-based confidences. For instance, the training logic 426 may provide sample inputs and sample contextual information, which includes context regarding the sample inputs, to the AI algorithm to train the AI algorithm. The sample data may be labeled. The AI algorithm may be configured to derive relationships between the features (e.g., the first embedding, the sets of historical embeddings, the information about the plurality of classes, the third embedding, the sets of fourth embeddings, the information about the plurality of possible security actions, and so on) and the resulting AI-based confidences. The inference logic is configured to utilize the AI algorithm, which is trained by the training logic 426, to determine the AI-based confidence when the features are provided as inputs to the algorithm.

In an example generative language model embodiment, any one or more of the incident security logic 416 (e.g., the set selection logic 430, the embedding selection logic 432, and/or the incident prioritization logic 434 therein), the incident classification logic 418 (e.g., one or more of the first models 436 therein), the security action selection logic 420 (e.g., one or more of the second models 438 therein), the security recommendation logic 422, the sampling logic 424, and/or the alert aggregation logic 428 includes (e.g., is) a generative language model. A generative language model is an AI model that is capable of generating original text output based on sample data. Examples of a generative language model include but are not limited to a generative pre-trained transformer 3 (a.k.a., GPT-3®) model and a generative pre-trained transformer 4 (a.k.a. GPT-4®) model, developed and distributed by OpenAI, Inc.; a large language model Meta AI (a.k.a. LLaMA®) model, developed and distributed by Meta Platforms Inc.; a language model for dialogue applications (a.k.a., LaMDA®) model and a Gemini® model, developed and distributed by Google LLC; and a BigScience large open-science open-access multilingual language model (a.k.a. BLOOM) model, developed and distributed by the BigScience collaborative initiative. A generative language model may use any suitable relevancy determination and/or ranking technique. For instance, the generative language model may use a BM25 (a.k.a. Okapi BM25) ranking function to perform its analysis (e.g., based on keywords).

In an example LLM embodiment, any one or more of the incident security logic 416 (e.g., the set selection logic 430, the embedding selection logic 432, and/or the incident prioritization logic 434 therein), the incident classification logic 418 (e.g., one or more of the first models 436 therein), the security action selection logic 420 (e.g., one or more of the second models 438 therein), the security recommendation logic 422, the sampling logic 424, and/or the alert aggregation logic 428 includes a large language model (LLM). A large language model is an artificial neural network that is capable of performing natural language processing (NLP) tasks. For instance, the large language model may use a transformer model to perform the NLP tasks. In an aspect, the large language model is trained (e.g., pre-trained) using self-supervised learning and semi-supervised learning. Examples of a large language model include but are not limited to the GPT-3® and GPT-4® models, developed and distributed by OpenAI, Inc.; the LLaMA® model, developed and distributed by Meta Platforms Inc.; and a pathways language model (a.k.a., PaLM®) model and the Gemini® model, developed and distributed by Google LLC.

In an example embedding embodiment, any one or more of the incident security logic 416 (e.g., the set selection logic 430, the embedding selection logic 432, and/or the incident prioritization logic 434 therein), the incident classification logic 418 (e.g., one or more of the first models 436 therein), the security action selection logic 420 (e.g., one or more of the second models 438 therein), the security recommendation logic 422, the sampling logic 424, and/or the alert aggregation logic 428 includes an embedding model. An embedding model is an AI model that uses deep learning to convert data into vectors (a.k.a. feature vectors or embeddings), which represent attributes of the data, and that compares at least a subset of the vectors to determine an extent to which the vectors that are included in the subset are similar. For instance, each vector may represent a semantic meaning of one or more identified security incidents, one or more historical security incidents, one or more security alerts, one or more historical security alerts, one or more classes, or one or more possible security actions. A vector that represents multiple items (e.g., multiple identified security incidents, historical security incidents, security alerts, historical security alerts, classes, or possible security actions) may be a combination (e.g., average or median) of respective vectors of the items.

In an example multi-model embodiment, any one or more of the incident security logic 416 (e.g., the set selection logic 430, the embedding selection logic 432, and/or the incident prioritization logic 434 therein), the incident classification logic 418 (e.g., one or more of the first models 436 therein), the security action selection logic 420 (e.g., one or more of the second models 438 therein), the security recommendation logic 422, the sampling logic 424, and/or the alert aggregation logic 428 includes multiple types of AI models. Weights may be applied to the responses generated by the respective types of AI models. For example, any one or more of the aforementioned components of the geographically diversified embedding-based guided response logic 408 may include a generative AI model and an embedding model. In accordance with this example, a first weight may be applied to a first response generated by the generative AI model to provide a first weighted response, and a second weight that is different from the first weight may be applied to a second response of the embedding model to provide a second weighted response. Any one or more of the aforementioned components may combine (e.g., sum) the first weighted response and the second weighted response to generate a respective output (e.g., AI response).

In a first aspect of the embedding embodiment, the incident security logic 416 or the incident classification logic 418 (e.g., one or more of the first AI models 436 therein) includes embedding model(s) that generate the first embedding by embedding the identified security incident.

In a second aspect of the embedding embodiment, the incident security logic 416 or the incident classification logic 418 (e.g., one or more of the first AI models 436 therein) includes embedding model(s) that generate the sets of historical embeddings (including the sets of designated embeddings and the sets of other embeddings) by embedding the historical security incidents.

In a third aspect of the embedding embodiment, the security action selection logic 420 (e.g., one or more of the second AI models 438 therein) includes embedding model(s) that generate the third embedding by embedding the security alert.

In a fourth aspect of the embedding embodiment, the security action selection logic 420 (e.g., one or more of the second AI models 438 therein) includes embedding model(s) that generate the sets of fourth embeddings by embedding the sets of historical security alerts associated with the respective geographical regions.

Any one or more of the embedding models described herein may be an encoder-only model, a decoder-only model, or an encoder-decoder model. One example of an encoder-only model is the bidirectional encoder representations from transformers (BERT™) model, which is developed and distributed by Google LLC. One example of an encoder-decoder model is the FLAN-T5™ model, which is developed and distributed by Google LLC.

The geographically diversified embedding-based guided response logic 408 may include the following features: incident summarization, script analyzer, incident report, Kusto query assistant, and guided response. The first four features combine large language models (LLMs), security-specific plugins to contextualize and analyze security data, and post-processing the AI-generated responses to provide key insights. Guided response is unique by its inclusion of three distinct sub-features that may not be based on natural language-grade recommendation, action recommendation, and similar incident recommendation-which may be tailored to the specific preferences of SOCs. Consequently, these sub-features may closely align with traditional machine learning techniques to enable precise and context-specific recommendations.

The guided response functionality of the geographically diversified embedding-based guided response logic 408 may include machine learning capabilities to contextualize an incident and learn from previous investigations to generate appropriate response actions. For instance, the guided response functionality may include the following capabilities: (1) investigation that suggests next steps for further analysis; (2) triaging to determine whether an incident is a true positive, false positive, or benign positive (informational); and (3) remediation which proposes specific response actions to contain and resolve incidents. These capabilities are discussed in further detail below.

Investigation: Assisting security analysts in their investigation of incidents is one aspect of cybersecurity. Machine learning assisted investigation may include: (1) similar incident identification, (2) investigation assistance, and (3) playbook recommendation. The geographically diversified embedding-based guided response logic 408 is capable of generating a similar incident recommendation in SOCs.

Triaging: Incident triaging may be a time intensive initial task that is performed by junior security analysts who sort through large volumes of incidents to identify incidents that warrant further investigation. This process may include prioritizing incidents for in-depth investigation and filtering them based on the likelihood of being true positive versus benign or false positive. Machine learning may be employed to automate the triaging process by utilizing threat intelligence feeds, correlated alerts, or historical data. The geographically diversified embedding-based guided response logic 408 may provide a machine learning (ML) triaging architecture that is capable of scaling, adapting, and deploying to hundreds of thousands of SOCs around the world.

Remediation: The majority of research related to SOC remediation occurs within the domain of intrusion response systems (IRSs). IRSs are designed to notify SOC analysts, or in certain cases, dynamically respond to detected intrusions. The IRSs may leverage various decision-making models, including rule-based approaches, multi-objective optimization, game theory, reinforcement learning, and others to select optimal responses based on the current state of the system, the nature of the attack, and the potential impact of the countermeasures. The geographically diversified embedding-based guided response logic 408 may be capable of addressing (e.g., resolving) shortcomings of the IRSs, such as scaling to handle industry demands, such as managing millions of incidents per day, integrating with complex incident scenarios involving hundreds of alerts across hundreds of thousands of classes, and customizing responses to specific SOC preferences.

The geographically diversified embedding-based guided response logic 408 may include the following pipelines: train, inference, and embedding. To manage heavy data preprocessing efficiently, the geographically diversified embedding-based guided response logic 408 may utilize a PySpark™ distributed computational engine whenever possible, while reserving Python® for last mile recommendation tasks that do not have PySpark™ support. An example implementation of these pipelines is discussed below, indicating how the pipelines may synergize to guide security analysts through the processes of investigating, triaging, and remediating security incidents.

Train pipeline: In an aspect, the train pipeline runs weekly. This pipeline trains the first models 436 and the second models 438 shown in FIG. 4 using historical SOC telemetry to provide tailored responses. An example implementation of this procedure is detailed across ten steps, T1 through T10, which are described in further detail below with reference to FIG. 5 below.

Inference pipeline: In an aspect, the inference pipeline runs every 15 minutes. This pipeline generates the incident classification information 454 and the security action information 456 for incoming incidents by leveraging the first models 436 and the second models 438, which are developed in the train pipeline. This pipeline also generates the designated incident information 452 by matching new incidents with historically similar incidents generated in the embedding pipeline.

Embedding pipeline: In an aspect, the embedding pipeline runs every 30 minutes until 180 days of incident embeddings are generated. The embeddings that are generated by the embedding pipeline form the foundational data that allows the incident security logic 416 in the inference pipeline to effectively identify similar incidents.

To adhere to privacy regulations, geographically diversified embedding-based guided response logic 408 may be uniformly replicated across each geographical region, utilizing a Synapse™ integrated analytics service, which is developed and distributed by Microsoft Corporation, to ensure consistency and compliance. Consequently, the following discussion focuses on the development of geographically diversified embedding-based guided response logic 408 from the perspective of a single geographical region.

FIG. 5 depicts an example guided response training algorithm 500 for the geographically diversified embedding-based guided response logic 408 shown in FIG. 4 in accordance with an embodiment. The guided response training algorithm 500 includes an example ten step process (T1-T10) for creating alert and incident data frames leveraged across the train, inference, and embedding pipelines described above.

Preprocessing: Steps T1-T7, which are described in detail below, pertain to preprocessing.

T1—Feature engineering. Alert telemetry may be collected from multiple Azure® Data Lake Storage (ADLS) tables and joined into a PySpark™ alert data frame. Each row in the alert data frame may contain columns for unique alert and incident identifiers, complemented by customer-provided grade and remediation action, when available. In an example implementation, each row contains the following categorical feature columns-OrganizationId, DetectorId, ProductId, Category, and Severity-along with a suitable number (e.g., 40, 67, or 100) of engineered numerical feature columns. Rows may be retained even if they lack a customer grade or action because the alerts can merge with other alerts to form incidents that do contain such data.

T2—Feature space compression. Before converting the categorical columns to one-hot-encoded representations, the challenge of high cardinality in the DetectorId and OrgId columns may be addressed. In various geographical regions, DetectorIds can exceed 100,000 and OrgIds can reach up to 50,000, creating an relatively large and sparse feature space that may lead to failures during dimensionality reduction in the PySpark™ Synapse™ cluster. To mitigate this, the feature space may be aggregated by substituting infrequent values (e.g., those associated with fewer than 10 alerts) with a generic value. This technique, while resulting in some information loss, may ensure that the system remains within the computational boundaries of the PySpark™ cluster.

T3—One-hot-encoding. With the preliminary adjustments to the feature space, the categorical feature columns may be converted into their one-hot-encoded (OHE) form. This transformation may include columns such as OrgId, ProductId, and DetectorId, which allows the models to capture SOC-specific tendencies and product-specific and detector-specific characteristics that evolve over time. The data may be bifurcated, and a secondary PySpark™ alert data frame that contains only alerts with remediation actions may be established, while retaining all alerts in the original data frame. The PySpark™ OHE pipeline may be stored in an Azure® Blog Storage container so that it can be used in the inference process to transform the categorical columns.

T4—Forming incidents. To enhance the ability to make precise incident-level triaging decisions and investigation recommendations, a separate incident data frame may be created. This may be achieved by aggregating alert rows based on shared IncidentIds from the alert data frame that includes all alerts and summing their respective numerical columns. For incidents with multiple grades, the majority label may be applied, with ties going to the true positive class. Incidents without a triage grade may be removed at this stage.

T5—Sampling incidents. Given that incident processing steps may be significantly more memory-intensive than remediation actions in the alert data frame, random sampling may be employed on the incident data frame to mitigate out-of-memory issues during downstream processing steps. This sampling strategy may include creating a unique IncidentHash identifier for each incident by arranging the DetectorIds of an incident into an ordered list and hashing it using SHA1. The number of incidents may be capped for each unique IncidentHash and triage grade to a maximum of 1,000.

T6—Dimensionality reduction. Principal component analysis (PCA) may be independently applied to the incident and alert data frames. Each data frame may include tens of thousands of columns. Leveraging the PySpark™ native machine learning library and its distributed computing capabilities enables the feature space to be reduced, which may prevent out-of-memory errors when centralizing the data frames to the primary PySpark™ node for scikit-learn model training. In an aspect, the feature space is reduced into k principal components that captures at least 95% of the original variance in each data frame, where k is a positive integer. For instance, setting k to 40 may be sufficient to achieve this goal. The resulting PCA model weights may be stored in an Azure® Blob Storage container for use in the inference and embedding pipelines.

T7—Store embeddings. The incident embeddings may be saved to an ADLS table to enhance the similar incident recommendation algorithm (e.g., used by the incident security logic 416) in the inference pipeline. In an aspect, only the top N most similar incidents are displayed for any given incident, where N is a positive integer. For instance, N may be 3, 4, 5, 6, or 7. In accordance with this aspect, only up to N instances of each incident may be stored. The N instances may be categorized by triage grade (e.g., class) and the unique set of DetectorIds that comprise the IncidentHash.

Model Training: Steps T8-T10, which are described in detail below, pertain to model training.

The first models 436 and the second models 438 are trained across the following steps: (1) converting the PySpark™ data frames to Pandas and performing a stratified train-val-test split; (2) optimizing random forest models with a grid search; and (3) validating new models against previous versions before storage. The first models 436 models may be referred to as triage models to predict incident grades. The second models 438 may be referred to as action models to determine remediation actions for incident-related alerts. While the PySpark™ native Mllib™ machine learning library is an option, it may result in a 10% decrease in Macro-F1 score compared to scikit-learn due to missing core capabilities. For instance, the random forest model of the Mllib™ machine learning library is limited to a depth of 30, which may significantly constrain its ability to capture complex patterns.

T8—Dataset formation. The alert and incident PySpark™ data frames are converted into Pandas. For each Pandas data frame, a standard 70-10-20 train, validation, and test set split of the data may be conducted. The set split may be stratified by grade and action labels.

T9—Training process. A random forest model may be selected due to its efficiency on the CPU-based PySpark™ infrastructure and its reliable performance with tabular data. A grid search may be conducted over specified model parameters. Following are some example model parameters that may be used: n_estimators=100, 200, 300, 400, max_depth=30, 50, 75, 100, min_samples_split=5, 10, 15, and class_weight='balanced', N one. The model with the highest macro-F1 score on the validation set may be selected.

T10—Validation and model storage. Once the best model has been identified for both the triage and remediation tasks, the models are compared with previous models to ensure quality between training cycles remains within a specified range (e.g., 2%, 3%, 4%, or 5%). It is not necessary for each model to have a higher macro-F1 score because new detectors and security products are onboarded over time, which may cause fluctuations in performance. After validation, the models may be saved to an Azure® Blob Storage container for use in the inference pipeline.

Inference Pipeline: Leveraging the infrastructure of the train pipeline, the inference pipeline may begin with preprocessing of batched alert data to facilitate guided response recommendations. The trained models and historical embeddings then may be employed across the following sequential phases: triage (e.g., using the incident classification logic 418) to predict incident grades, investigation (e.g., using the incident security logic 416) to identify similar incidents, and remediation (e.g., using the security action selection logic 420) to determine response actions. As incidents evolve, recommendations (e.g., generated by the security recommendation logic 422) are dynamically updated to incorporate the latest information. Upon completion, the inference pipeline stores these guided response recommendations in a table to ensure rapid access for user of the geographically diversified embedding-based guided response logic 408.

FIG. 6 depicts an example guided response inference algorithm 600 for the geographically diversified embedding-based guided response logic 408 shown in FIG. 4 in accordance with an embodiment. The guided response inference algorithm 600 includes a step-by-step overview of an example inference process.

Preprocessing: The initial phase of the inference pipeline prepares real-time batched alert data for guided response recommendations. The process begins by retrieving the last 15 minutes of alert telemetry and loading the telemetry into a PySpark™ data frame. These alerts are processed using the feature space compression and one-hot encoding techniques described above with regard to preprocessing steps T1-T7 for the train pipeline. Following this, the alert data is bifurcated into multiple distinct PySpark™ data frames: a first PySpark™ data frame is dedicated to generating remediation predictions, and a second PySpark™ data frame is dedicated to aggregating alerts into incidents for similar incident and triage recommendations, utilizing the aggregation process described above with regard to preprocessing steps T1-T7 for the train pipeline. The latest PCA models from the training pipeline are applied to reduce the dimensionality of the first and second PySpark™ data frames to form alert and incident embeddings. The incident embeddings are stored in a table (e.g., an ADLS table) to enhance the similar incident recommendations, with a limit of five instances per incident, categorized by triage grade and DetectorId. The first and second PySpark™ data frames are converted into Pandas data frames to facilitate subsequent triage, investigation, and remediation processes.

Triage Recommendations: In the triage phase, incident embeddings produced during preprocessing are used with the latest version of the triage model to generate triage recommendations. Each incident is evaluated by the triage model and given a prediction of true positive (TP), false positive (FP), or benign positive (BP). Benign positive is considered to be an informational incident. The confidence of each recommendation is assessed against a precision threshold (e.g., 0.8, 0.9, or 0.95), which may ensure that only reliable recommendations are sent to SOC analysts.

Investigation Recommendations: In the investigation phase, the incident embeddings produced during the preprocessing step are used to generate recommendations for similar incidents. This process begins with the retrieval of historical incident embeddings from the Azure® Data Lake Storage (ADLS), going back up to 180 days. These embeddings capture past incidents in a vectorized format, enabling efficient comparison. New incidents are matched with historically relevant incidents within the same organization through a matching process that includes the following steps:

(1) Exact hash matching. Historical incidents that share the same IncidentHash and triage recommendation are identified. If fewer than a specified number (e.g., 4, 5, 6, or 7) matches are found, incidents with the same IncidentHash but differing triage recommendations are taken.

(2) Approximate matching with cosine similarity. If fewer than a specified number (e.g., 4, 5, 6, or 7) exact matches were found, a search for historical incidents is performed based on the similarity (e.g., cosine similarity) of their embeddings. This approach helps to identify incidents that share significant characteristics with the current incident.

(3) Top-k similar incident selection. The top-k most similar incidents (e.g., up to a maximum number) are selected. For instance, the maximum number may be 4, 5, 6, or 7. Exact and similarity (e.g., cosine similarity) matches are ordered, with a higher priority given to exact matches (e.g., to ensure the most germane comparisons).

Remediation Recommendations: In the remediation phase, alert embeddings produced during preprocessing are leveraged with the latest version of the remediation model to generate targeted response action recommendations. In an aspect, each alert is evaluated by the remediation model and given a prediction of "contain user", "isolate machine", or "stop virtual machine". The confidence of each recommendation is assessed against a precision threshold (e.g., 0.8, 0.9, or 0.95), which may ensure that only reliable recommendations are provided to the SOC analyst. The correct entity (e.g., user, device, or virtual machine) associated with each alert is identified based on a set of encoded rules that leverage security research domain knowledge. Individual alert recommendations are aggregated to create comprehensive incident recommendations.

Embedding Pipeline: In an aspect, this pipeline generates historical incident embeddings that allow the similar incident recommendation algorithm to leverage up to 180 days of historical data when making recommendations. Due to the limitations of the training pipeline in processing huge volumes of historical incident telemetry across large regions, a specialized mechanism may be used to generate historical embeddings. This approach may guarantee that the similar incident recommendation algorithm reaches comprehensive historical incident coverage relatively quickly each time the training pipeline is executed.

The embedding pipeline may operate in a continuous loop, with each iteration processing data from one day further back than the last. Leveraging the preprocessing steps outlined above with regard to the inference pipeline, a deduplication process may be integrated. This may involve loading historical incident embeddings and comparing incident hashes and triage recommendations to eliminate redundancy. Any IncidentHash and triage recommendation pairs from the current batch, including those without a triage grade, may be stored, so long as they do not exceed a specified number (e.g., 4, 5, 6, or 7) of stored embeddings. This aligns with a policy of recommending no more than a specified number (e.g., 4, 5, 6, or 7) of similar incidents at a time. New incident embeddings are saved to the table (e.g., the ADLS table) for use in the inference pipeline. This procedure repeats until 180 days of historical incident embedding telemetry is accumulated.

It will be recognized that the computing system 400 may not include one or more of the geographically diversified embedding-based guided response logic 408, the store 414, the incident security logic 416, the incident classification logic 418, the security action selection logic 420, the security recommendation logic 422, the sampling logic 424, the training logic 426, the alert aggregation logic 428, the set selection logic 430, the embedding selection logic 432, the incident prioritization logic 434, the first models 436, and/or the models 438. Furthermore, the computing system 400 may include components in addition to or in lieu of the geographically diversified embedding-based guided response logic 408, the store 414, the incident security logic 416, the incident classification logic 418, the security action selection logic 420, the security recommendation logic 422, the sampling logic 424, the training logic 426, the alert aggregation logic 428, the set selection logic 430, the embedding selection logic 432, the incident prioritization logic 434, the first models 436, and/or the models 438.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the geographically diversified embedding-based guided response logic 408, the store 414, the incident security logic 416, the incident classification logic 418, the security action selection logic 420, the security recommendation logic 422, the sampling logic 424, the training logic 426, the alert aggregation logic 428, the set selection logic 430, the embedding selection logic 432, the incident prioritization logic 434, the first models 436, the models 438, flowchart 200, and/or flowchart 300 may be implemented in hardware, software, firmware, or any combination thereof.

For example, any one or more of the geographically diversified embedding-based guided response logic 408, the store 414, the incident security logic 416, the incident classification logic 418, the security action selection logic 420, the security recommendation logic 422, the sampling logic 424, the training logic 426, the alert aggregation logic 428, the set selection logic 430, the embedding selection logic 432, the incident prioritization logic 434, the first models 436, the models 438, flowchart 200, and/or flowchart 300 may be implemented, at least in part, as computer program code configured to be executed in one or more processors.

In another example, any one or more of the geographically diversified embedding-based guided response logic 408, the store 414, the incident security logic 416, the incident classification logic 418, the security action selection logic 420, the security recommendation logic 422, the sampling logic 424, the training logic 426, the alert aggregation logic 428, the set selection logic 430, the embedding selection logic 432, the incident prioritization logic 434, the first models 436, the models 438, flowchart 200, and/or flowchart 300 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 7:
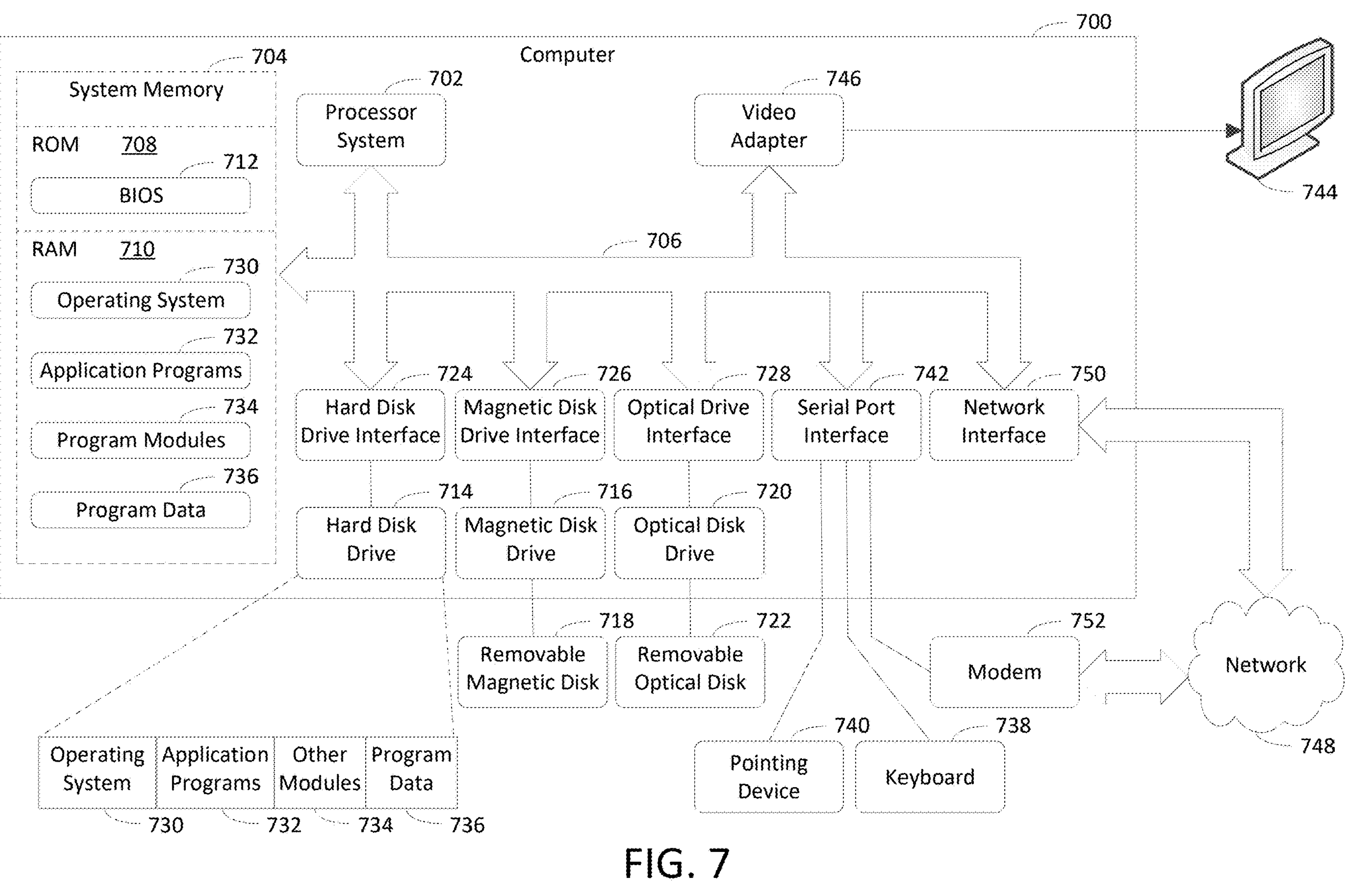
FIG. 7 depicts an example computer in which embodiments may be implemented.

II. Further Discussion of Some Example Embodiments (A1) An example system (FIG. 1, 102A-102M, 106A-106N; FIG. 4, 400; FIG. 7, 700) comprises a processor system (FIG. 7, 702) and a memory (FIG. 7, 704, 708, 710) that stores computer-executable instructions. The computer-executable instructions are executable by the processor system to at least receive (FIG. 2, 202) a security alert (FIG. 4, 404) regarding an identified security incident that is associated with an entity. The computer-executable instructions are executable by the processor system further to at least classify (FIG. 2, 206) the identified security incident into selected classes for respective geographical regions (FIG. 1, 112A-112N), the selected classes determined from a plurality of classes by applying a first embedding of the identified security incident to first models (FIG. 4, 436) that are trained to map sets of second embeddings of sets of historical security incidents (FIG. 4, 448) to corresponding sets of classes of the plurality of classes. The plurality of classes correspond to at least one of validity of security concerns or maliciousness of actions that result in the security concerns. The computer-executable instructions are executable by the processor system further to at least select (FIG. 2, 208) security actions to be performed with regard to the entity in the respective geographical regions by applying a third embedding of the security alert to second models (FIG. 4, 438) that are trained to map sets of fourth embeddings of sets of historical security alerts (FIG. 4, 450) associated with the respective geographical regions to corresponding sets of security actions. The computer-executable instructions are executable by the processor system further to at least generate (FIG. 2, 210) a security recommendation (FIG. 4, 458) regarding the security alert. The security recommendation comprises a representation (FIG. 4, 464) of the selected classes and a representation (FIG. 4, 466) of the security actions.

(A2) In the example system of A1, wherein the computer-executable instructions are executable by the processor system to at least: select a first set of designated security incidents from a first set of historical security incidents associated with a first geographical region by performing the following operations: select a first number of designated security incidents from the first set of historical security incidents to be comprised in the first set of designated security incidents as a result of embeddings of the first number of designated security incidents and the first embedding being same and further as a result of the first number of designated security incidents corresponding to a common class of the plurality of classes; and select a second number of designated security incidents from the first set of historical security incidents to be comprised in the first set of designated security incidents as a result of embeddings of the second number of designated security incidents and the first embedding being same and further as a result of the first number of designated security incidents corresponding to different classes of the plurality of classes.

(A3) In the example system of any of A1-A2, wherein a number of the designated security incidents in the first set is limited to a threshold number; and wherein the computer-executable instructions are executable by the processor system to select the first set of designated security incidents further by performing the following operation: select a third number of designated security incidents from the first set of historical security incidents to be comprised in the first set of designated security incidents as a result of embeddings of the third number of designated security incidents being different from the first embedding and further as a result of the threshold number being equal to a sum of the first number, the second number, and the third number.

(A4) In the example system of any of A1-A3, wherein the computer-executable instructions are executable by the processor system further to at least: select a predefined, fixed number of embeddings from a corpus of embeddings of a specified corpus of historical security incidents associated with a specified geographical region to define a specified set of embeddings associated with the specified geographical region as a result of distances between the first embedding and the embeddings in the specified set satisfying a distance criterion.

(A5) In the example system of any of A1-A4, wherein the computer-executable instructions are executable by the processor system further to at least: select a representative sample of a plurality of historical security incidents associated with a specified geographical region to define a specified set of historical security incidents associated with the specified geographical region by comparing a plurality of embeddings of the plurality of historical security incidents, the representative sample comprising fewer than all of the plurality of historical security incidents.

(A6) In the example system of any of A1-A5, wherein the computer-executable instructions are executable by the processor system further to perform at least one of the following: train the first models to map the sets of second embeddings to the corresponding sets of classes using a random forest technique; or train the second models to map the sets of fourth embeddings to the corresponding sets of security actions using the random forest technique.

(A7) In the example system of any of A1-A6, wherein the computer-executable instructions are executable by the processor system further to at least: generate a second embedding of a historical security incident in a set of historical incidents associated with a specified geographical region by arranging identifiers, which identify detectors that generate alerts that are comprised in the historical security incident, into an ordered list and hashing the ordered list.

(A8) In the example system of any of A1-A7, wherein the sets of historical security alerts associated with the respective geographical regions correspond to a predefined, fixed period of time.

(A9) In the example system of any of A1-A8, wherein the sets of historical security alerts associated with the respective geographical regions are limited to a predefined, fixed number of historical security alerts.

(A10) In the example system of any of A1-A9, wherein the computer-executable instructions are executable by the processor system to at least: generate a specified set of fourth embeddings of a specified set of historical security alerts associated with a specified geographical region by combining features of the specified set of historical security alerts that occur fewer than a threshold number of times in the specified set of historical security alerts into a common value in the specified set of fourth embeddings; and as a result of combining the features of the specified set of historical security alerts that occur fewer than the threshold number of times in the specified set of historical security alerts into the common value in the specified set of fourth embeddings, select a first security action to be performed with regard to the entity in the specified geographical region.

(A11) In the example system of any of A1-A10, wherein the computer-executable instructions are executable by the processor system further to at least: generate a specified set of fourth embeddings of a specified set of historical security alerts associated with a specified geographical region by configuring the specified set of fourth embeddings to represent a predefined, fixed number of features of the specified set of historical security alerts.

(A12) In the example system of any of A1-A11, wherein the computer-executable instructions are executable by the processor system further to at least: provide a set of historical security alerts associated with a specified geographical region by aggregating multiple historical security alerts, which are comprised in a corpus of historical security alerts associated with the specified geographical region, into a single representative historical security alert as a result of identifiers that identify the multiple historical security alerts satisfying a similarity criterion; and generate a set of historical security incidents associated with the specified geographical region by incorporating the representative historical security alert into the set of historical security incidents.

(A13) In the example system of any of A1-A12, wherein the computer-executable instructions are executable by the processor system further to at least: assign priorities to designated security incidents in sets of designated security incidents that are selected from the sets of historical security incidents, the priorities corresponding to likelihoods of the designated security incidents to cause damage to a system; wherein the security recommendation comprises a representation of the sets of designated security incidents, the representation of the selected classes, and the representation of the security actions; and wherein the representation of the sets of designated security incidents indicates the priorities.

(B1) An example method is implemented by a computing system (FIG. 1, 102A-102M, 106A-106N; FIG. 4, 400; FIG. 7, 700). The method comprises receiving (FIG. 2, 202) a security alert (FIG. 4, 440) regarding an identified security incident associated with an entity. The method further comprises selecting (FIG. 2, 204) sets of designated security incidents from sets of historical security incidents (FIG. 4, 448) associated with respective geographical regions (FIG. 1, 112A-112N) as a result of distances between a first embedding, which represents the identified security incident, and sets of designated embeddings, which represent the sets of designated security incidents, being less than or equal to distances between the first embedding and sets of other embeddings, which represent sets of other security incidents in the sets of historical security incidents. The method further comprises classifying (FIG. 2, 206) the identified security incident into selected classes, the selected classes determined from a plurality of classes by applying the first embedding, which represents the identified security incident, to first models (FIG. 4, 436) that are trained to map sets of second embeddings, which represent the sets of historical security incidents associated with the respective geographical regions, to corresponding sets of classes of the plurality of classes. The plurality of classes correspond to at least one of validity of security concerns or maliciousness of actions that result in the security concerns. The method further comprises selecting (FIG. 2, 208) security actions from a plurality of possible security actions to be performed with regard to the entity in the respective geographical regions by applying a third embedding, which represents the security alert, to second models (FIG. 4, 438) that are trained to map sets of fourth embeddings, which represent sets of historical security alerts (FIG. 4, 450) associated with the respective geographical regions, to corresponding sets of security actions. The method further comprises generating (FIG. 2, 210) a security recommendation (FIG. 4, 458) regarding the security alert. The security recommendation comprises a representation (FIG. 4, 462) of the sets of designated security incidents, a representation (FIG. 4, 464) of the selected classes into which the identified security incident is classified, and a representation (FIG. 4, 466) of the security actions to be performed with regard to the entity in the respective geographical regions.

(B2) In the example method of B1, wherein the plurality of classes comprises at least a false positive class, a true positive class, and a benign positive class; wherein the false positive class corresponds to an invalid security concern;

wherein the true positive class corresponds to a valid security concern resulting from an action that is deemed malicious; wherein the benign positive class corresponds to a valid security concern resulting from an action that is deemed benign; and wherein the security actions are selected from the plurality of possible security actions as a result of the selected classes being the true positive class.

(B3) In the example method of any of B1-B2, wherein the sets of historical security incidents associated with the respective geographical regions correspond to a predefined, fixed period of time.

(B4) In the example method of any of B1-B3, wherein the sets of historical security incidents associated with respective geographical regions are limited to a predefined, fixed number of historical security incidents.

(B5) In the example method of any of B1-B4, further comprising: generating a specified set of second embeddings that represents a specified set of historical security incidents associated with a specified geographical region by combining features of the specified set of historical security incidents that occur fewer than a threshold number of times in the specified set of historical security incidents into a common value in the specified set of second embeddings; wherein selecting the sets of designated security incidents from the sets of historical security incidents associated with the respective geographical regions comprises: as a result of combining the features of the specified set of historical security incidents that occur fewer than the threshold number of times in the specified set of historical security incidents into the common value in the specified set of second embeddings, selecting a first set of designated security incidents from the specified set of historical security incidents associated with the specified geographical region.

(B6) In the example method of any of B1-B5, further comprising: generating a specified set of second embeddings that represents a specified set of historical security incidents associated with a specified geographical region by configuring the specified set of second embeddings to represent a predefined, fixed number of features of the specified set of historical security incidents.

(B7) In the example method of any of B1-B6, further comprising: selecting a representative sample of a plurality of historical security alerts associated with a specified geographical region to define a specified set of historical security alerts associated with the specified geographical region by comparing a plurality of embeddings that represent the plurality of historical security alerts, the representative sample comprising fewer than all of the plurality of historical security alerts.

(B8) In the example method of any of B1-B7, wherein at least one of the following: the representation of the sets of designated security incidents in the security recommendation is an aggregation of the sets of designated security incidents that is agnostic with regard to geographical region; or the representation of the security actions to be performed with regard to the entity in the respective geographical regions is an aggregation of the security actions that is agnostic with regard to geographical region.

(C1) An example computer program product (FIG. 7, 718, 722) comprises a computer-readable storage medium having instructions recorded thereon for enabling a processor-based system (FIG. 1, 102A-102M, 106A-106N; FIG. 4, 400; FIG. 7, 700) to perform operations. The operations comprise classifying (FIG. 2, 206) an identified security incident associated with an entity into selected classes for respective geographical regions (FIG. 1, 112A-112N), the selected classes determined from a plurality of classes by applying a first embedding, which represents the identified security incident, to a first model (FIG. 4, 436) that is trained to map sets of second embeddings, which represent sets of historical security incidents (FIG. 4, 448) associated with the respective geographical regions, to corresponding sets of classes of the plurality of classes. The plurality of classes correspond to at least one of validity of security concerns or maliciousness of actions that result in the security concerns. The operations further comprise selecting (FIG. 2, 208) security actions from a plurality of possible security actions to be performed with regard to the entity in the respective geographical regions by applying a third embedding, which represents a security alert (FIG. 4, 440) regarding the identified security incident, to a second model (FIG. 4, 438) that is trained to map sets of fourth embeddings, which represent sets of historical security alerts (FIG. 4, 450) associated with the respective geographical regions, to corresponding sets of security actions. The operations further comprise generating (FIG. 2, 210) a security recommendation (FIG. 4, 458) regarding the security alert. The security recommendation comprises a representation (FIG. 4, 464) of the selected classes into which the identified security incident is classified and a representation (FIG. 4, 466) of the security actions to be performed with regard to the entity in the respective geographical regions.

III. Example Computer System

FIG. 7 depicts an example computer 700 in which embodiments may be implemented. Any one or more of the user devices 102A-102M and/or any one or more of the servers 106A-106N shown in FIG. 1 and/or the computing system 400 shown in FIG. 4 may be implemented using computer 700, including one or more features of computer 700 and/or alternative features. Computer 700 may be a general-purpose computing device in the form of a conventional personal computer, a mobile computer, or a workstation, for example, or computer 700 may be a special purpose computing device. The description of computer 700 provided herein is provided for purposes of illustration, and is not intended to be limiting. Embodiments may be implemented in further types of computer systems, as would be known to persons skilled in the relevant art(s).

As shown in FIG. 7, computer 700 includes a processor system 702, a system memory 704, and a bus 706 that couples various system components including system memory 704 to processor system 702. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random access memory (RAM) 710. A basic input/output system 712 (BIOS) is stored in ROM 708.

Computer 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 730, one or more application programs 732, other program modules 734, and program data 736. Application programs 732 or program modules 734 may include, for example, computer program logic for implementing any one or more of (e.g., at least a portion of) the geographically diversified embedding-based guided response logic 408, the store 414, the incident security logic 416, the incident classification logic 418, the security action selection logic 420, the security recommendation logic 422, the sampling logic 424, the training logic 426, the alert aggregation logic 428, the set selection logic 430, the embedding selection logic 432, the incident prioritization logic 434, the first models 436, the models 438, flowchart 200 (including any step of flowchart 200), and/or flowchart 300 (including any step of flowchart 300), as described herein.

A user may enter commands and information into the computer 700 through input devices such as keyboard 738 and pointing device 740. Other input devices (not shown) may include a microphone, joystick, game pad, satellite dish, scanner, touch screen, camera, accelerometer, gyroscope, or the like. These and other input devices are often connected to the processor system 702 through a serial port interface 742 that is coupled to bus 706, but may be connected by other interfaces, such as a parallel port, game port, or a universal serial bus (USB).

A display device 744 (e.g., a monitor) is also connected to bus 706 via an interface, such as a video adapter 746. In addition to display device 744, computer 700 may include other peripheral output devices (not shown) such as speakers and printers.

Computer 700 is connected to a network 748 (e.g., the Internet) through a network interface or adapter 750, a modem 752, or other means for establishing communications over the network. Modem 752, which may be internal or external, is connected to bus 706 via serial port interface 742.

As used herein, the terms "computer program medium" and "computer-readable storage medium" are used to generally refer to media (e.g., non-transitory media) such as the hard disk associated with hard disk drive 714, removable magnetic disk 718, removable optical disk 722, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 732 and other program modules 734) may be stored on the hard disk, magnetic disk, optical disk, ROM, or RAM. Such computer programs may also be received via network interface 750 or serial port interface 742. Such computer programs, when executed or loaded by an application, enable computer 700 to implement features of embodiments discussed herein. Accordingly, such computer programs represent controllers of the computer 700.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

IV. Conclusion

The foregoing detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system comprising:

a processor system; and a memory that stores computer-executable instructions that are executable by the processor system to at least:

receive a security alert regarding an identified security incident associated with an entity;

classify the identified security incident into selected classes for respective geographical regions, the selected classes determined from a plurality of classes by applying a first embedding of the identified security incident to first models that are trained to map sets of second embeddings of sets of historical security incidents to corresponding sets of classes of the plurality of classes, the plurality of classes corresponding to at least one of validity of security concerns or maliciousness of actions that result in the security concerns;

select security actions to be performed with regard to the entity in the respective geographical regions by applying a third embedding of the security alert to second models that are trained to map sets of fourth embeddings of sets of historical security alerts associated with the respective geographical regions to corresponding sets of security actions; and generate a security recommendation regarding the security alert, the security recommendation comprising a representation of the selected classes and a representation of the security actions.

2. The system of claim 1, wherein the computer-executable instructions are executable by the processor system to at least:

select a first set of designated security incidents from a first set of historical security incidents associated with a first geographical region by performing the following operations:

select a first number of designated security incidents from the first set of historical security incidents to be comprised in the first set of designated security incidents as a result of embeddings of the first number of designated security incidents and the first embedding being same and further as a result of the first number of designated security incidents corresponding to a common class of the plurality of classes; and select a second number of designated security incidents from the first set of historical security incidents to be comprised in the first set of designated security incidents as a result of embeddings of the second number of designated security incidents and the first embedding being same and further as a result of the first number of designated security incidents corresponding to different classes of the plurality of classes.

3. The system of claim 2, wherein a number of the designated security incidents in the first set is limited to a threshold number; and wherein the computer-executable instructions are executable by the processor system to select the first set of designated security incidents further by performing the following operation:

select a third number of designated security incidents from the first set of historical security incidents to be comprised in the first set of designated security incidents as a result of embeddings of the third number of designated security incidents being different from the first embedding and further as a result of the threshold number being equal to a sum of the first number, the second number, and the third number.

4. The system of claim 1, wherein the computer-executable instructions are executable by the processor system further to at least:

select a predefined, fixed number of embeddings from a corpus of embeddings of a specified corpus of historical security incidents associated with a specified geographical region to define a specified set of embeddings associated with the specified geographical region as a result of distances between the first embedding and the embeddings in the specified set satisfying a distance criterion.

5. The system of claim 1, wherein the computer-executable instructions are executable by the processor system further to at least:

select a representative sample of a plurality of historical security incidents associated with a specified geographical region to define a specified set of historical security incidents associated with the specified geographical region by comparing a plurality of embeddings of the plurality of historical security incidents, the representative sample comprising fewer than all of the plurality of historical security incidents.

6. The system of claim 1, wherein the computer-executable instructions are executable by the processor system further to perform at least one of the following:

train the first models to map the sets of second embeddings to the corresponding sets of classes using a random forest technique; or train the second models to map the sets of fourth embeddings to the corresponding sets of security actions using the random forest technique.

7. The system of claim 1, wherein the computer-executable instructions are executable by the processor system further to at least:

generate a second embedding of a historical security incident in a set of historical incidents associated with a specified geographical region by arranging identifiers, which identify detectors that generate alerts that are comprised in the historical security incident, into an ordered list and hashing the ordered list.

8. The system of claim 1, wherein the sets of historical security alerts associated with the respective geographical regions correspond to a predefined, fixed period of time.

9. The system of claim 1, wherein the sets of historical security alerts associated with the respective geographical regions are limited to a predefined, fixed number of historical security alerts.

10. The system of claim 1, wherein the computer-executable instructions are executable by the processor system to at least:

generate a specified set of fourth embeddings of a specified set of historical security alerts associated with a specified geographical region by combining features of the specified set of historical security alerts that occur fewer than a threshold number of times in the specified set of historical security alerts into a common value in the specified set of fourth embeddings; and as a result of combining the features of the specified set of historical security alerts that occur fewer than the threshold number of times in the specified set of historical security alerts into the common value in the specified set of fourth embeddings, select a first security action to be performed with regard to the entity in the specified geographical region.

11. The system of claim 1, wherein the computer-executable instructions are executable by the processor system further to at least:

generate a specified set of fourth embeddings of a specified set of historical security alerts associated with a specified geographical region by configuring the specified set of fourth embeddings to represent a predefined, fixed number of features of the specified set of historical security alerts.

12. The system of claim 1, wherein the computer-executable instructions are executable by the processor system further to at least:

provide a set of historical security alerts associated with a specified geographical region by aggregating multiple historical security alerts, which are comprised in a corpus of historical security alerts associated with the specified geographical region, into a single representative historical security alert as a result of identifiers that identify the multiple historical security alerts satisfying a similarity criterion; and generate a set of historical security incidents associated with the specified geographical region by incorporating the representative historical security alert into the set of historical security incidents.

13. The system of claim 1, wherein the computer-executable instructions are executable by the processor system further to at least:

assign priorities to designated security incidents in sets of designated security incidents that are selected from the sets of historical security incidents, the priorities corresponding to likelihoods of the designated security incidents to cause damage to a system;

wherein the security recommendation comprises a representation of the sets of designated security incidents, the representation of the selected classes, and the representation of the security actions; and wherein the representation of the sets of designated security incidents indicates the priorities.

14. A method implemented by a computing system, the method comprising:

receiving a security alert regarding an identified security incident associated with an entity;

selecting sets of designated security incidents from sets of historical security incidents associated with respective geographical regions as a result of distances between a first embedding, which represents the identified security incident, and sets of designated embeddings, which represent the sets of designated security incidents, being less than or equal to distances between the first embedding and sets of other embeddings, which represent sets of other security incidents in the sets of historical security incidents;

classifying the identified security incident into selected classes, the selected classes determined from a plurality of classes by applying the first embedding, which represents the identified security incident, to first models that are trained to map sets of second embeddings, which represent the sets of historical security incidents associated with the respective geographical regions, to corresponding sets of classes of the plurality of classes, the plurality of classes corresponding to at least one of validity of security concerns or maliciousness of actions that result in the security concerns;

selecting security actions from a plurality of possible security actions to be performed with regard to the entity in the respective geographical regions by applying a third embedding, which represents the security alert, to second models that are trained to map sets of fourth embeddings, which represent sets of historical security alerts associated with the respective geographical regions, to corresponding sets of security actions; and generating a security recommendation regarding the security alert, the security recommendation comprising a representation of the sets of designated security incidents, a representation of the selected classes into which the identified security incident is classified, and a representation of the security actions to be performed with regard to the entity in the respective geographical regions.

15. The method of claim 14, wherein the plurality of classes comprises at least a false positive class, a true positive class, and a benign positive class;

wherein the false positive class corresponds to an invalid security concern;

wherein the true positive class corresponds to a valid security concern resulting from an action that is deemed malicious;

wherein the benign positive class corresponds to a valid security concern resulting from an action that is deemed benign; and wherein the security actions are selected from the plurality of possible security actions as a result of the selected classes being the true positive class.

16. The method of claim 14, wherein the sets of historical security incidents associated with the respective geographical regions correspond to a predefined, fixed period of time.

17. The method of claim 14, wherein the sets of historical security incidents associated with respective geographical regions are limited to a predefined, fixed number of historical security incidents.

18. The method of claim 14, further comprising:

generating a specified set of second embeddings that represents a specified set of historical security incidents associated with a specified geographical region by combining features of the specified set of historical security incidents that occur fewer than a threshold number of times in the specified set of historical security incidents into a common value in the specified set of second embeddings;

wherein selecting the sets of designated security incidents from the sets of historical security incidents associated with the respective geographical regions comprises:

as a result of combining the features of the specified set of historical security incidents that occur fewer than the threshold number of times in the specified set of historical security incidents into the common value in the specified set of second embeddings, selecting a first set of designated security incidents from the specified set of historical security incidents associated with the specified geographical region.

19. The method of claim 14, further comprising:

generating a specified set of second embeddings that represents a specified set of historical security incidents associated with a specified geographical region by configuring the specified set of second embeddings to represent a predefined, fixed number of features of the specified set of historical security incidents.

20. The method of claim 14, further comprising:

selecting a representative sample of a plurality of historical security alerts associated with a specified geographical region to define a specified set of historical security alerts associated with the specified geographical region by comparing a plurality of embeddings that represent the plurality of historical security alerts, the representative sample comprising fewer than all of the plurality of historical security alerts.

21. The method of claim 14, wherein at least one of the following:

the representation of the sets of designated security incidents in the security recommendation is an aggregation of the sets of designated security incidents that is agnostic with regard to geographical region; or the representation of the security actions to be performed with regard to the entity in the respective geographical regions is an aggregation of the security actions that is agnostic with regard to geographical region.

22. A computer program product comprising a computer-readable storage medium having instructions recorded thereon for enabling a processor-based system to perform operations, the operations comprising:

classifying an identified security incident associated with an entity into selected classes for respective geographical regions, the selected classes determined from a plurality of classes by applying a first embedding, which represents the identified security incident, to a first model that is trained to map sets of second embeddings, which represent sets of historical security incidents associated with the respective geographical regions, to corresponding sets of classes of the plurality of classes, the plurality of classes corresponding to at least one of validity of security concerns or maliciousness of actions that result in the security concerns;

selecting security actions from a plurality of possible security actions to be performed with regard to the entity in the respective geographical regions by applying a third embedding, which represents a security alert regarding the identified security incident, to a second model that is trained to map sets of fourth embeddings, which represent sets of historical security alerts associated with the respective geographical regions, to corresponding sets of security actions; and generating a security recommendation regarding the security alert, the security recommendation comprising a representation of the selected classes into which the identified security incident is classified and a representation of the security actions to be performed with regard to the entity in the respective geographical regions.

* * * * *